US006826674B1

(12) United States Patent
Sato

(10) Patent No.: US 6,826,674 B1
(45) Date of Patent: Nov. 30, 2004

(54) PROGRAM PRODUCT AND DATA PROCESSOR

(75) Inventor: Tomoyoshi Sato, Tsukuba (JP)

(73) Assignee: IP Flex, Inc., Tokyo (JP)

( * ) Notice: Subject to any disclaimer, the term of this patent is extended or adjusted under 35 U.S.C. 154(b) by 526 days.

(21) Appl. No.: 09/830,664

(22) PCT Filed: Aug. 30, 2000

(86) PCT No.: PCT/JP00/05849

§ 371 (c)(1),
(2), (4) Date: Aug. 6, 2001

(87) PCT Pub. No.: WO01/16711

PCT Pub. Date: Mar. 8, 2001

(30) Foreign Application Priority Data

Aug. 30, 1999 (JP) .......................................... 11-244137

(51) Int. Cl.[7] .............................................. G06F 3/00
(52) U.S. Cl. ........................... 712/200; 712/11; 712/33
(58) Field of Search .............................. 712/11, 33, 200

(56) References Cited

U.S. PATENT DOCUMENTS

| | | | |
|---|---|---|---|
| 5,452,455 A | * | 9/1995 | Brown et al. ............... 713/100 |
| 5,551,570 A | | 9/1996 | Shaffer et al. |
| 5,617,431 A | * | 4/1997 | Tupuri et al. ............... 714/738 |
| 5,742,180 A | | 4/1998 | DeHon et al. |
| 5,956,518 A | | 9/1999 | DeHon et al. |
| 5,966,534 A | | 10/1999 | Cooke et al. |
| 5,970,254 A | * | 10/1999 | Cooke et al. ................ 712/37 |
| 6,052,773 A | | 4/2000 | DeHon et al. |
| 6,282,627 B1 | * | 8/2001 | Wong et al. ................. 712/15 |
| 6,477,643 B1 | * | 11/2002 | Vorbach et al. ............. 713/100 |
| 6,647,511 B1 | * | 11/2003 | Swoboda et al. ............. 714/30 |

FOREIGN PATENT DOCUMENTS

| | | |
|---|---|---|
| EP | 05412169 A2 | 5/1993 |
| JP | 61294548 A | 12/1986 |
| JP | 01156824 A | 6/1989 |
| JP | 02183332 A | 7/1990 |
| JP | 06309285 | 11/1994 |
| JP | 07253882 | 10/1995 |
| JP | 07319692 | 12/1995 |
| JP | 10260832 | 9/1998 |
| JP | 2000-207202 | 7/2000 |

OTHER PUBLICATIONS

International Search Report, International Application No. PCT/JP00/05849, Nov. 13, 2000.
English translation of International Preliminary Examination Report.

* cited by examiner

Primary Examiner—William M. Treat
(74) Attorney, Agent, or Firm—Marshall, Gerstein & Borun LLP

(57) ABSTRACT

In the present invention, an input and/or output interface of at least one of a plurality of processing units forming a data processing system is designated independently of timing of execution of the processing unit, so as to allow the plurality of processing units to define various data paths at the program level. The present invention makes it possible to flexibly execute individual complicated data processes with hardware at a high speed without having various dedicated circuits fixed specifically to the respective data processings

21 Claims, 14 Drawing Sheets

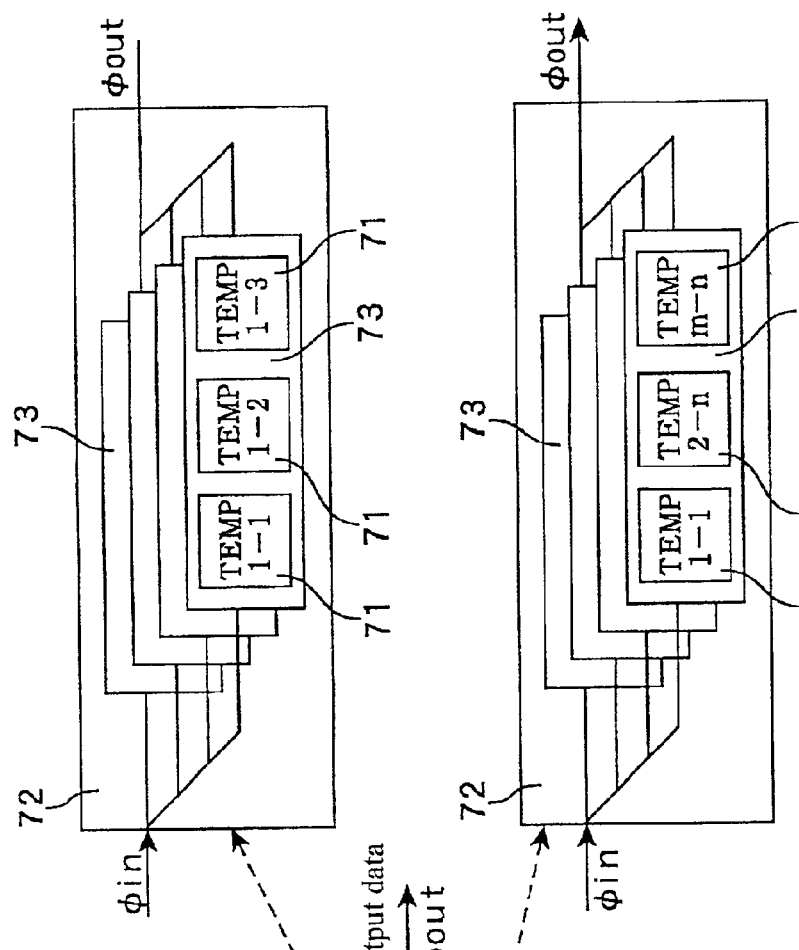
*Fig. 14(b)*
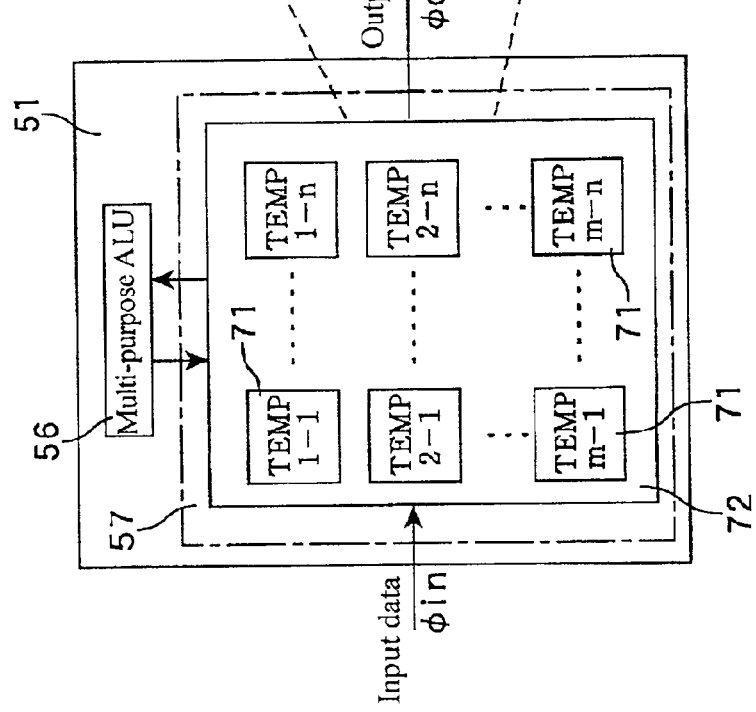
*Fig. 14(c)*
*Fig. 14(a)*

PROGRAM PRODUCT AND DATA PROCESSOR

TECHNICAL FIELD

The present invention relates to a control program product described with microcodes or the like, and a data processing system capable of executing the control program.

BACKGROUND OF THE INVENTION

Processors (data processing systems or LSIs) incorporating an operation function such as microprocessor (MPU) and digital signal processor (DSP) are known as apparatuses for conducting general-purpose processing and special digital data processing. Architectural factors that have significantly contributed to improved performance of these processors include pipelining technology, super-pipelining technology, super-scalar technology, VLIW technology, and addition of specialized data paths (special purpose instructions). The architectural elements further include branch prediction, register bank, cache technology, and the like.

In the VLIW technology, the data paths are configured in advance so as to allow for parallel execution, optimization is conducted so that a compiler improves the parallel execution and generates a proper VLIW instruction code. This technology adopts an extremely rational idea, eliminating the need for the circuitry for checking the likelihood of parallel execution of individual instructions as in the super-scalar. Therefore, this technology is considered to be extremely promising as means for realizing the hardware for parallel execution. However, given a processor for use in processing of an application that requires image processing or special data processing, the VLIW is not an optimal solution either. This is because, particularly in applications requiring continuous or sequential processing using the operation results, there is a limit in executing operations or data processing while holding the data in a general-purpose register as in VLIW. This problem is the same in the conventional pipeline technology.

On the other hand, it is well known from the past experiences that various matrix calculations, vector calculations and the like are conducted with higher performance when implemented in dedicated circuitry. Therefore, in the most advanced technology for achieving the highest performance, the idea based on the VLIW becomes major with the various dedicated arithmetic circuits mounted according to the purpose of applications.

However, the VLIW is the technology of improving the parallel-processing execution efficiency near a program counter. Therefore, the VLIW is not so effective in, e.g., executing two or more objects simultaneously or executing two or more functions. Moreover, mounting various dedicated arithmetic circuits increases the hardware, also reduces software flexibility.

The architecture of FPGA (Field Programmable Gate Arrays) is capable of changing connection between transistors and controlling dynamically to some degree, therefore, various dedicated arithmetic circuits may be implemented. However, in FPGA based architecture, it takes a long time for dynamically changing the hardware, and some another hardware for reducing that time is required. Therefore, it is difficult to dynamically control the hardware during execution of the application actually, and it dose not become an economical solution. It is possible to retain the reconfiguration information of the FPGA in a RAM of two faces or more for operating in the background so as to dynamically change the architecture in an apparently short time. However, in order to enable this reconfiguration to be conducted within several clocks, it is required to mount the RAM that stores all of number of combinations of information for reconfiguring the FPGA. This does not at all essentially solve the economical problem of a long reconfiguration time of the FPGA. Moreover, the original problem of the FPGA, i.e. poor AC characteristics at the practical level, that comes from the purpose of FPGA to efficiently implementing mapping in terms of the gate of the hardware, is not likely to be solved for the time being.

It is therefore an object of the present invention to provide a system, such as a program product, a data processing system capable of executing the program and a control method of the processing system, in the system, complicated data processings are flexibly executed at a high speed without using various dedicated circuits specific to those data processings originally. It is another object of the present invention to provide a more economical data processing system, a control method of the processing system and a program product, allowing for dynamic hardware control even during execution of an application, and capable of implementing the software-level flexibility at the hardware level and of executing various data processings at a high speed.

SUMMARY OF THE INVENTION

Therefore, the present invention provides a program product for controlling a data processing system including a plurality of processing units. The program product or program apparatus including a data flow designation instruction for designating input and/or output interfaces of at least one of the processing units independently of the time or timing of execution of the processing unit so as to define a data path configured by the processing unit. This program can be provided in a form recorded or stored on a recording medium readable with the data processing system, such as ROM or RAM. This program can alternatively be provided in a form embedded in a transmission medium capable of being transmitted over a computer network or another communication.

The present invention also provides the data processing system comprising a plurality of processing units including changeable input and/or output interfaces; a unit for fetching the data flow designation instruction for designating the input and/or output intercedes of at least one of the processing units independently of the time or timing of execution of the processing unit; and a data flow designation unit for decoding the data flow designation instruction and setting the input and/or output interfaces of the processing unit so as to configure a data path from a plurality of the processing units. The program product of the present invention controls the processing system. Accordingly, the data path formed from a combination of a plurality of processing units is changed with the program, so that various data processings are executed with hardware, i.e., the data path or data flow, that is suitable for each of that various processings.

A method for controlling the data processing system according to the present invention includes a step of fetching a data flow designation instruction that designates the input and/or output interfaces of at least one of the processing units independent of the processing execution timing of the processing unit; and a data flow designation step of decoding the data flow designation instruction and setting the input and/or output interfaces of the processing unit so as to configure some data path from a plurality of the processing units.

Conventionally, the only way to handle with a complicated data processing is to prepare dedicated circuitry and implement a special instruction for using the circuitry, thereby increasing the hardware costs. In contrast, in the system of the present invention, such as the program product, data processing system and control method thereof, the interfaces of the processing unit as an arithmetic logic unit are described, making it possible to introduce the structure of pipeline control and data path control into an instruction set, i.e., program product. This allows various data processings to be described with the program and executed with suitable hardware, whereby the data processing system having both the software flexibility and high-speed performance using dedicated circuitry is provided by this invention. Moreover, these data paths can be implemented without discontinuing execution of a main processing or general-purpose processing, therefore, the hardware is dynamic reconfigured during execution of an application.

Moreover, the present invention provides means that is effective not only in execution of parallel processing near a program counter, but also in simultaneous pseudo-execution of two or more objects and simultaneous pseudo-execution of two or more functions. In other words, in the conventional instruction set, two or more processings respectively based on remote program counters, such as data processings and algorithm executions having different contexts, cannot be activated simultaneously. In contrast, in the present invention, the data flows are appropriately designated with the data flow designation instructions, enabling the above processings to be performed regardless of the program counters.

Accordingly, with this instruction set, data path that seems to be effective in improvement in parallel processing performance from the application side can be incorporated previously from the software, so that the data path (data flow) thus implemented is activated from the software at the instruction level and as required. Since these data paths are used not only for the data processings corresponding to specific purpose, but also for such a purpose as for performing as a general state machine, the structure of this invention has an extremely high degree of freedom.

Moreover, the present invention enables a data path formed from a combination of the processing units to be changed by designating the interface of the processing units according to the data flow designation instruction. Accordingly, unlike the architecture of changing the connections between transistors like FPGA, the data paths are defined by merely switching the interfaces between the processing units having an appropriate and/or specific data processing function. Therefore, the hardware is reconfigured in a short time. Moreover, the data processing system of the present invention does not have the architecture requiring a general usage at the transistor level like FPGA, the mounting or packaging density is improved, whereby a compact, economical data processor such as system LSI can be provided. In addition, since the redundant structure is reduced, the processing speed is increased as well as the AC characteristic is improved.

Thus, in the program, data processing system and control method thereof according to the present invention, the instruction defining the interfaces of at least one processing unit included in the data processing system is recorded or described. Therefore, data flows become describable and the independency of the data paths is improved. As a result, such structures are readily provided that conducts the data flow designation while executing another instruction of the program, and even allows internal data path of the data processing system in the idle state to be lent for a more urgent processing that is being executed in another external data processor or another data processing system within the same chip.

Moreover, it is desirable that content or function of processing in the processing unit capable of configuring data paths by combining thereof, is changeable or variable according to the data flow designation instruction. In other words, in the data flow designation unit and the data flow designation step, it is desirable that the content of processing in the processing unit is changeable or variable according to the data flow designation instruction. This enables improvement in flexibility of the data path formed from a combination of the processing units, whereby an increased number of data processings can be conducted by the data-flow-type process with reduced hardware resources, allowing for improvement in performance.

The FPGA architecture may be employed in individual processing units. As described above, however, it takes a long time to dynamically change or reconfigurate the hardware, and also another hardware for reducing that time of reconfiguration is required. This makes it difficult to dynamically control the hardware within the processing unit during execution of an application. Should a plurality of RAMs be provided with a bank structure for instantaneous switching, switching on the order of several to several tens of units of clocks would requires a considerable number of bank structures. Thus, it is basically required to make each of the macro cells within the FPGA programmable independently and to detectable the time or timing of switching for implementing a program-based control mechanism. However, the current FPGA architecture is not enough to deal with such a structure, and a new instruction control mechanism for designating switching at an appropriate timing is required.

Accordingly, in the present invention, it is desirable to employ as the processing unit a circuit unit including a specific internal data path(s). The processing units having somewhat compact data paths are prepared as templates and combinations of the data paths are designated so as to conduct the data-flow-type processing. In addition, a part of the internal data path of the processing unit is selected according to the data flow designation instruction so as to change the function or content of processing performed in the processing unit. As a result, the hardware becomes more flexibly reconfigured in a short time.

For example, a processing unit including at least one logic gate and the internal data path(s) connecting the logic gate with the input/output interfaces makes it possible to change the processing content of the processing unit by changing the order of data to be input/output to the logic gate, changing connection between the logic gates or selecting the logic gate, and these changing and/or selecting are possible only selecting a part of the internal data path that is prepared in advance. Therefore, the content of processing in the processing unit is varied in a reduced or shorter time as compared to the FPGA that reconfigures the circuitry are possible in the transistor level. Moreover, the use of the internal data path that is ready to use some purpose previously reduces the number of redundant circuit elements and increases the area utilization efficiency of the transistors. Accordingly, the mounting or packaging density becomes high and economical processing system is provided. In the system, the data paths suitable for high-speed processings are provided and AC characteristics of the system become also excellent. Therefore, in the present invention, in the data Sow designation unit and step are capable, it is desirable to select a part of the internal data path of the processing unit according to the data flow designation instruction.

It is also desirable that the data flow designation unit has a fixation as a scheduler for managing the interface of the processing unit, in order to manage a schedule retaining the interface of each processing unit that is set based on the data flow designation instruction. For example, in the case where matrix calculation is performed only for a fixed time and filtering is conducted thereafter, the connection between the processing units within the data processing system are performed prior to execution of each processings and the each connection is kept using a time counter. Replacing the time counter with another comparison circuit or external event detector enables more complicated, flexible scheduling to be implemented.

Moreover, it is desirable that input and/or output interfaces of a processing block formed from a plurality of processing units are defined according to the data flow designation instruction. Since the interfaces in a plurality of processing units become changeable or reconfigurable with a single instruction, data paths associated with the plurality of processing units becomes changeable or reconfigurable with the single instruction. Accordingly, in the data flow designation unit, it is desirable that to change or configure the input and/or output interfaces in a processing block formed from a plurality of processing units, according to the data flow designation instruction.

It is more desirable to provide a memory storing a plurality of configuration data defining the input and/or output interfaces in the processing block, and, in the data flow designation unit or step, to change the input and/or output interfaces in the processing block by selecting one of the plurality of configuration data stored in the memory according to the data flow designation instruction. Since the configuration data is designated with the data flow designation instruction, changing of the interface of the plurality of processing units is controlled from the program without making the instruction itself redundant.

BRIEF DESCRIPTION OF THE DRAWINGS

FIG. 14 shows the state where different dedicated circuits are formed with different combinations of templates.

DESCRIPTION OF THE PREFERRED EMBODIMENT

Figure 1:
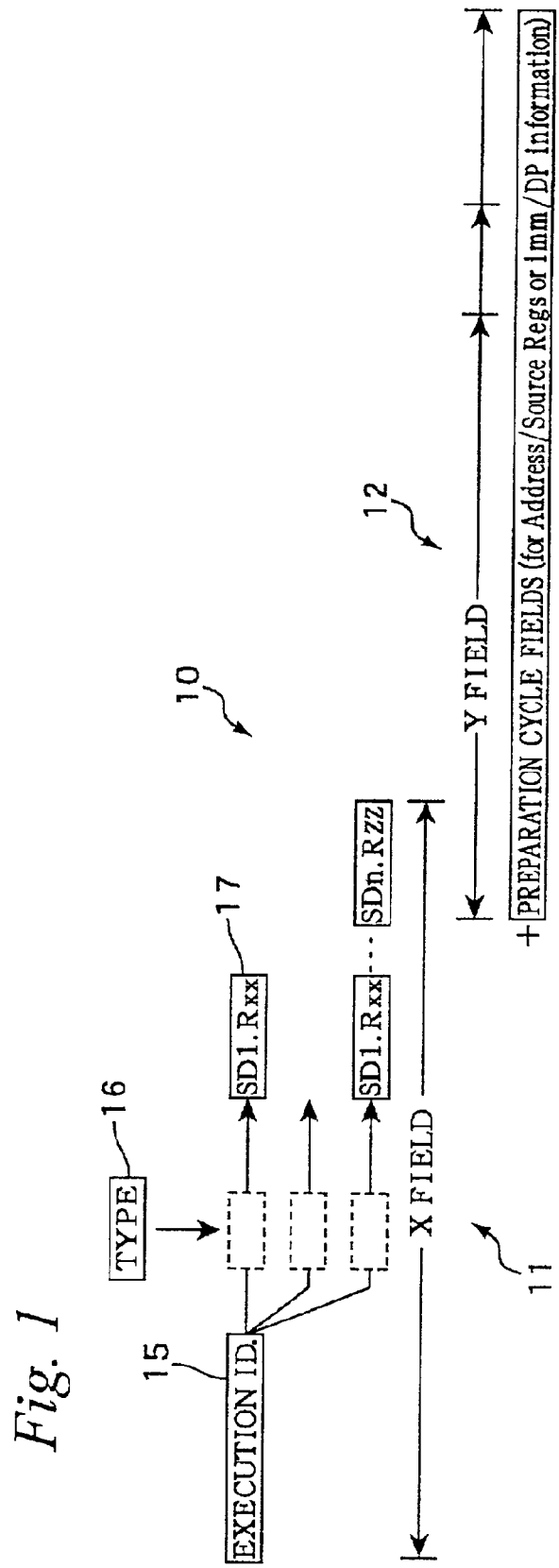
FIG. 1 illustrates an instruction set including data flow designation instruction of the present invention

Hereinafter, the present invention will be described in more detail with reference to the drawings. FIG. 1 shows the structure or format of the instruction set (instruction format) according to the present invention. The instruction set (instruction set of DAP/DNA) 10 in the present invention includes two fields: a first field called instruction execution basic field (X field) 11 and a second field called instruction execution preparation cycle field (additional field or Y field) 12 capable of improving efficiency of the subsequent instruction execution. The instruction execution basic field (X field) 11 specifies a data operation such as addition/subtraction, OR operation, AND operation and comparison, as well as the contents of various other data processings such as branching, and designates a location (destination) where the operation result is to be stored. Moreover, in order to improve the utilization efficiency of the instruction length, the X field 11 includes only information of the instructions for execution On the other hand, the additional field (Y field) 12 is capable of describing an instruction or instructions (information) independent of the execution instruction in the X field 11 of the same instruction set, and for example, is assigned for the information for execution preparation cycle of the subsequent instruction.

The instruction set 10 will be described in more detail. The X field 11 has an execution instruction field 15 describing the instruction operation or execution instruction (Execution ID) to a processing unit such as a arithmetic/logic unit, a field (type field) 16 indicating valid/invalid of the Y field 12 and the type of preparation instruction (preparation information) described in the Y field 12, and a field 17 showing a destination register. As described above, the description of the type field 16 is associated with the Y field 12 and can be defined independently of the descriptions of the other fields in the X field 11.

Figure 2:
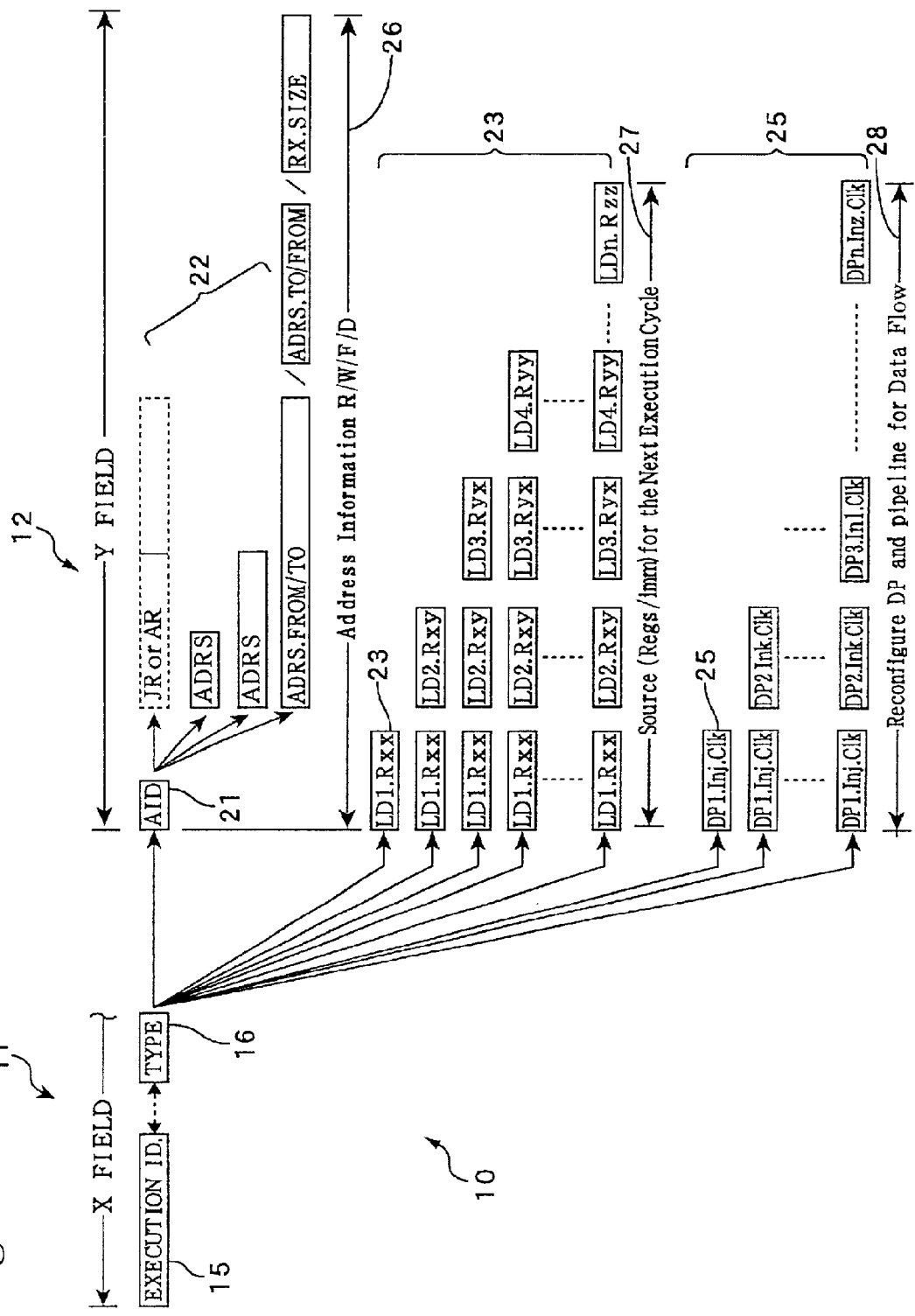
FIG. 2 illustrates in more detail a Y field of the instruction set of FIG. 1.

In the Y field 12, the preparation information defined by the type field 16 is described. The preparation information described in the Y field 12 are information for making an operation or other data processing ready for execution. Some specific examples thereof are shown in FIG. 2. First, it is noted again that the TYPE field 16 in the X field 11 is for describing information independently or regardless of the information in the execution instruction field 15. In the Y field 12, it is possible to describe an address information field 26 that describes an address ID (AID) 21, and address information 22 which intended use is defined by AD 21. This address information described in the Y field 12 is used for reading and writing between registers or buffers and memories (including register files), and block transferring like DMA becomes ready by the information in the Y field. It is also possible to describe the information such as an address indicating a branch destination upon execution of a branch instruction (fetch address) and a start address upon parallel execution in the Y field 12 as address information.

In the Y field, it is also possible to describe information 23 that defines an instruction of a register type, e.g., defined immediate (imm) and/or information of registers serving as source registers for the arithmetic operation or another logic operation instruction (including MOVE, memory read/write, and the like). In other words, it is possible to use the Y field 12 as a field 27 that defines sources for the subsequent execution instruction.

Furthermore, in the Y field 12, it is possible to describe data flow designation instruction or data flow designator 25 defines interfaces (source, destination) and processing content or function and/or their combination of an arithmetic/logic unit (ALU) or other data processing unit, e.g., a template having data path(s) being ready to use. Namely, the Y field 12 is utilized as a field 28 for description for defining reconfigure data paths to be pipelines (data flows or data paths) for conducting a specific data processing. In the Y field 12, it is also possible to describe the data flow designator 25 for starting or executing the data flow and designator 25 for terminating the data flow. Accordingly, the data flows provided with reconfigurable data paths defined by the Y field 12 enables execution of processes independently of a program counter for fetching a code from a code RAM.

It should be understood that the format of the instruction set as shown in FIGS. 1 and 2 is only one of examples of instruction set having two independent instruction fields according to the present invention, and the present invention is not limited to the format shown in FIGS. 1 and 2. It is possible to provide another instruction set that no instruction is described (NOP is described) in the X or Y fields and only the X field 11 or Y field 12 is effective actually. Another instruction set including mixedly a mnemonic operand and the data flow designator and the programs having such the instruction set are also possible. The programs having the data flow designation instructions described continuously are also possible. A specific example is not described below for clarity of description of the invention, however, a program product having the data flow designation instruction, regardless a form of description, and a recording medium recording such a program are also within the scope of the present invention.

Figure 3:
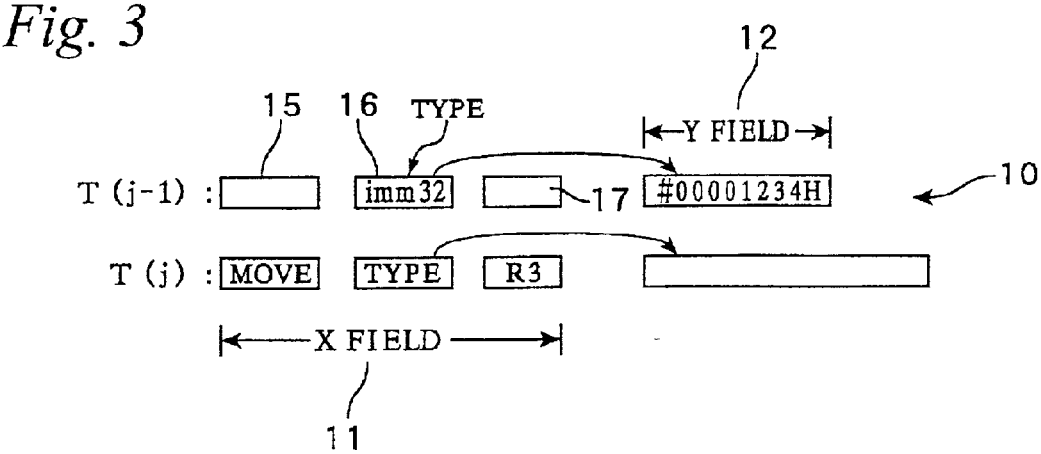
FIG. 3 illustrates one example using the instruction set of FIG. 1.

FIG. 3 shows an example of the instruction set 10 of this invention. In the number j–1 instruction set 10, T(j–1), the type field 16 of the X field 11 indicates that 32-bit immediate is described in the Y field 12 of the same instruction set. "#00001234H" is recorded as immediate in the Y field 12 of the instruction set T(j–1). In the following numberj instruction set T(j), "MOVE" is described in the execution instruction field 15 of the X field 11, and register R3 is indicated in the destination field 17. Accordingly, when this numberj instruction set T(j) is fetched, an ALU of a control unit stores, in the register R3, the immediate "#00001234H" defined in the preceding instruction set T(j–1).

Thus, in the instruction set 10 of this embodiment (hereinafter, the numberj instruction set 10 is referred to as instruction set T(j), preparation for the execution instruction described in the instruction set T(j) is made by means of the preceding instruction set T(j–1). Accordingly, the whole of processing to be executed by the ALU of the control unit cannot be known from the instruction set T(j) alone, but is uniquely determined from the two instruction sets T(j–1) and T(j). Moreover, in the execution instruction field 15 of the instruction set T(j–1), another execution instruction for another process prepared by the Y field 12 of the preceding instruction set is described independently of the Y field 12 of the instruction set T(j–1). Furthermore, in the type field 16 and Y field 12 of the instruction set T(j), another preparation information of another execution instruction described in the execution instruction field of the following instruction set is described.

In this embodiment, preparation information (preparation instruction) of the execution instruction described in the X field 11 of the instruction set T(j) is described in the Y field 12 of the immediately preceding instruction set T(j–1). In other words, in this example, latency of preparation instruction corresponds to one clock. However, preparation information may be described in another instruction set prior to the immediately preceding instruction set. For example, in a control program of the control unit having a plurality of ALUs, or for data flow control as described below, the preparation instruction need not be described in the immediately preceding instruction set. Provided that the state (environment or interface) of ALUs or the configuration of templates set by preparation instructions are held or kept until the instruction set having the execution instruction corresponding to that preparation instruction is fetched for execution, the preparation instruction can be described in the Y field 12 of the instruction set 10 that is preformed several instructions cycle before the instruction set 10 having the execution instruction corresponding to the preparation instruction.

Figure 4:
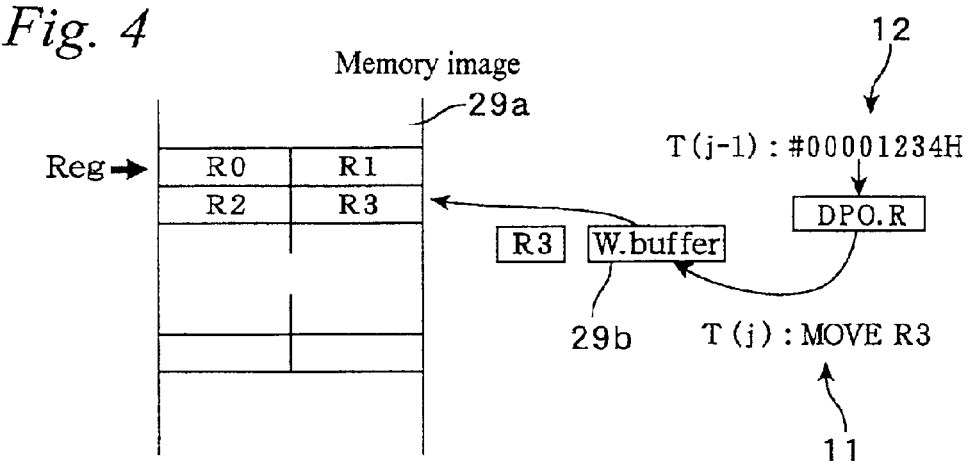
FIG. 4 illustrates how data are stored in a register by the instruction set of FIG. 3.

FIG. 4 shows the state where a data item is stored according to the instruction set of FIG. 3 in a register file or memory that functions as registers. A processor fetches the numbered j–1 instruction set T(j –1), and the immediate "#00001234H" is latched in a source register DPO.R of the ALU of the processor according to the preparation instruction in the Y field 12 thereof. Then, the processor fetches the following number j instruction set T(j), and the immediate thus latched is stored in a buffer 29b in the execution cycle of the execution instruction "MOVE" in the X field 11. Thereafter, the data item in the buffer 29b is saved at the address corresponding to the register R3 of the memory or the register file 29a. Even if the storage destination is not registers but memories, by the instruction set 10 of this embodiment enables the data to be loaded or stored in the execution instruction cycle by conducting the process according to the preparation information prior to the execution instruction.

Figure 5:
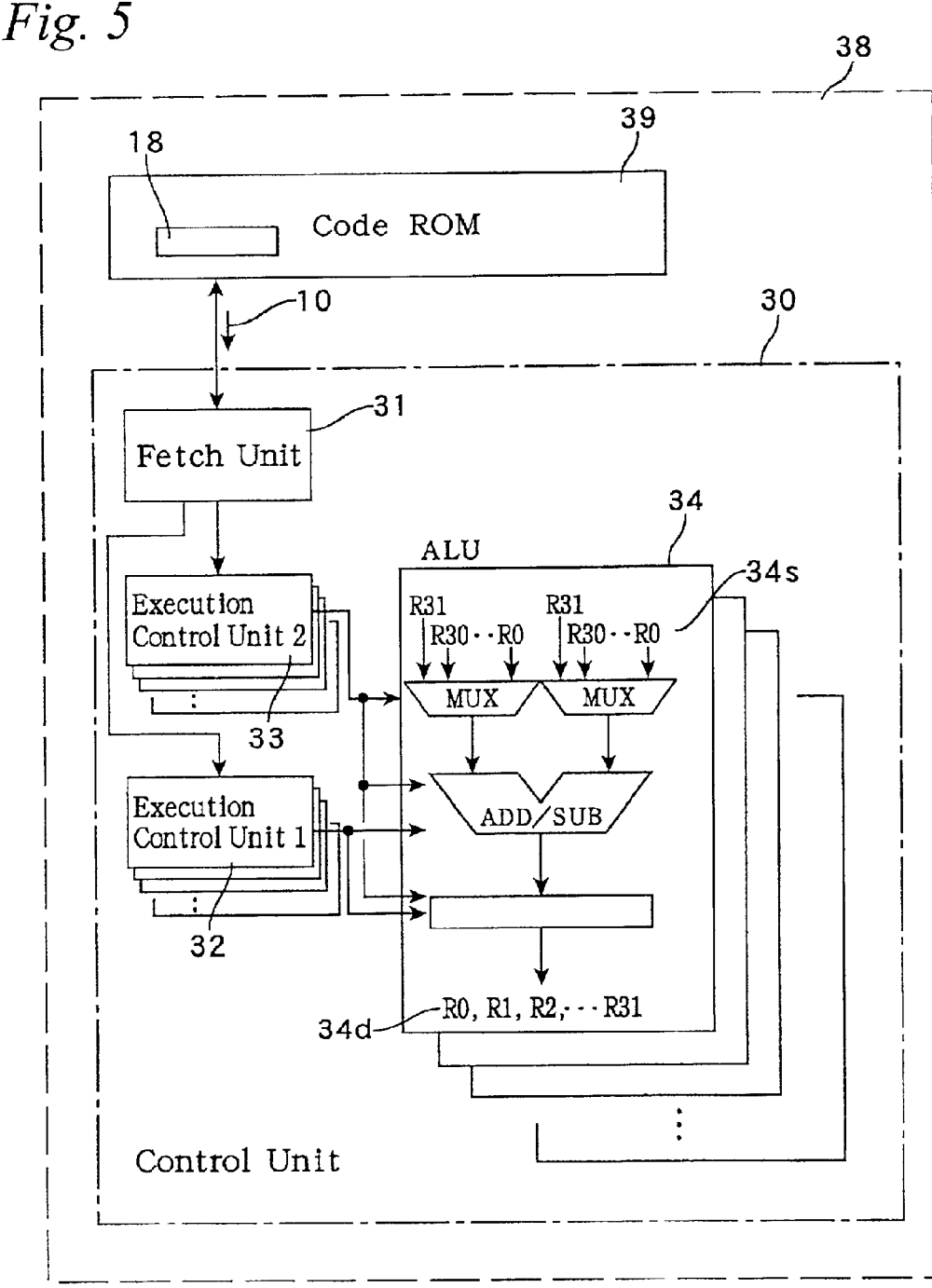
FIG. 5 illustrates a data processing system for executing the instruction set of the present invention.

FIG. 5 shows the schematic structure of a processor (data processing system) 38 having a control unit 30 capable of executing a program having the instruction sets 10 of this embodiment. Microcodes or microprograms 18 having the instruction sets 10 of this embodiment are saved in a code ROM 39. The control unit 30 includes a fetch unit 31 for fetching an instruction set 10 of the microprogram from the code ROM 39 according to a program counter whenever necessary, and a first execution control unit 32 having a function to decode the X field 11 of the fetched instruction set 10 so as to determine or assert the function of the ALU 34, and to select destination registers 34d so as to latch the logic operation result of the ALU 34 therein.

The control unit 30 further includes a second execution control unit 33 having a function to decode the Y field 12 of the fetched instruction set 10 based on the information in the type field 16 of the X field 11 and to select source registers 34s of the arithmetic processing unit (ALU) 34. This second execution control unit 33 is capable of interpreting the instruction or information in the Y field 12 independently of the description of the X field 11, except for the information in the type field 16. If the information described in the Y field 12 defines data flows, the second execution control unit 33 further has a function to select or set the source and destination sides of the ALU 34, i.e., determine the interface of the ALU 34, and to retain that state continuously until a predetermined clock or until a cancel instruction is given. Moreover, in the case where the information in the Y field 12 defines data flows, the second execution control unit 33 further determines the function (processing content) of the ALU 34 and retains that state for a predetermined period.

This control unit 30 further includes a plurality of combinations of such execution control units 32, 33 and ALUs 34, making it possible to execute various processes. As a result a DSP for high-speed image data processing, a general CPU or MPU capable of high-speed digital processing, and the like, can be configured using the control unit 30 as a core or peripheral circuitry.

Figure 6:
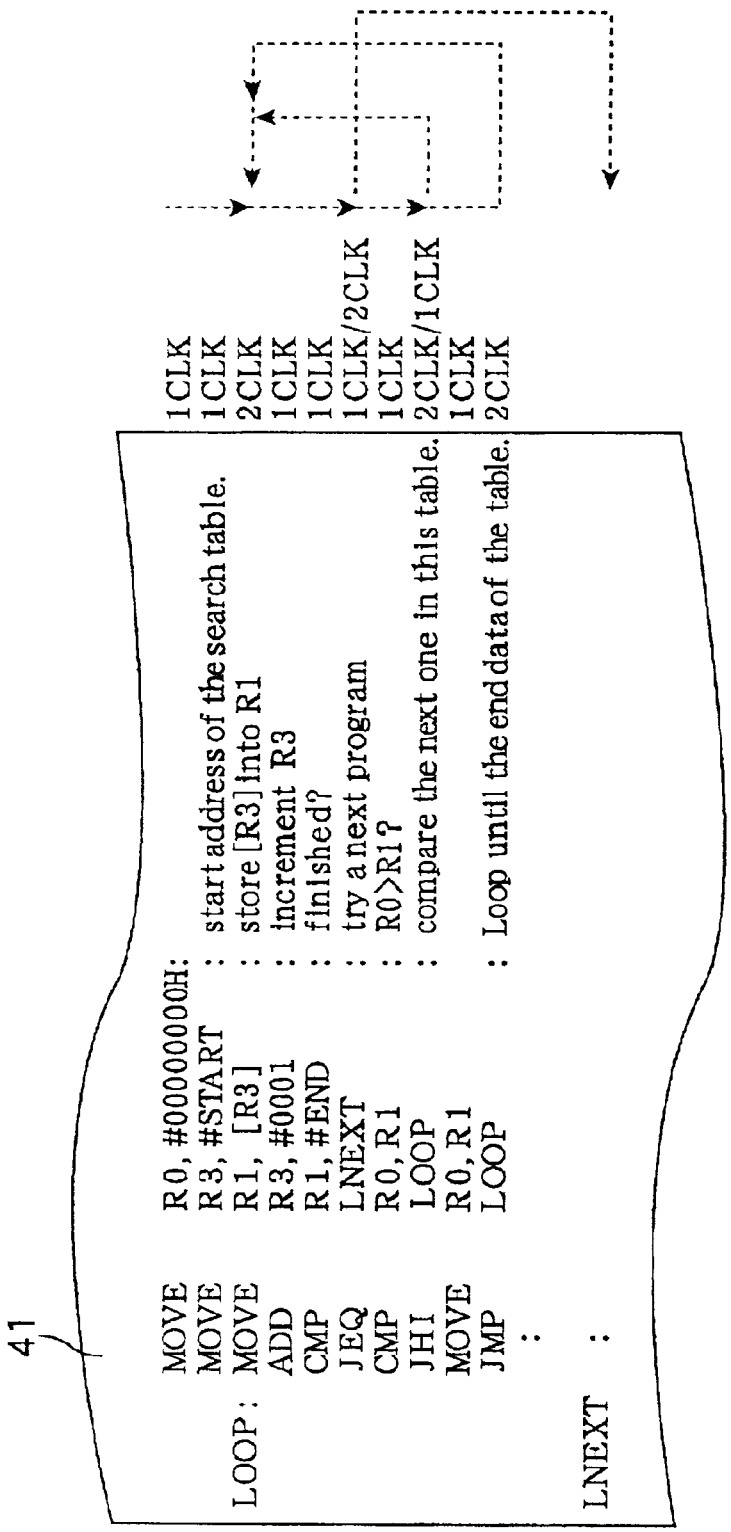
FIG. 6 illustrates a program executed with a conventional CPU or DSP.

FIGS. 6 to 9 show some sample programs executed by the control unit 30 of this embodiment. A sample program 41 shown in FIG. 6 is an example created so as to be executable by a conventional CPU or DSP. This program extracts the maximum value from a table starting with an address #START and is terminated upon detection of #END indicating the last data.

Figure 7:
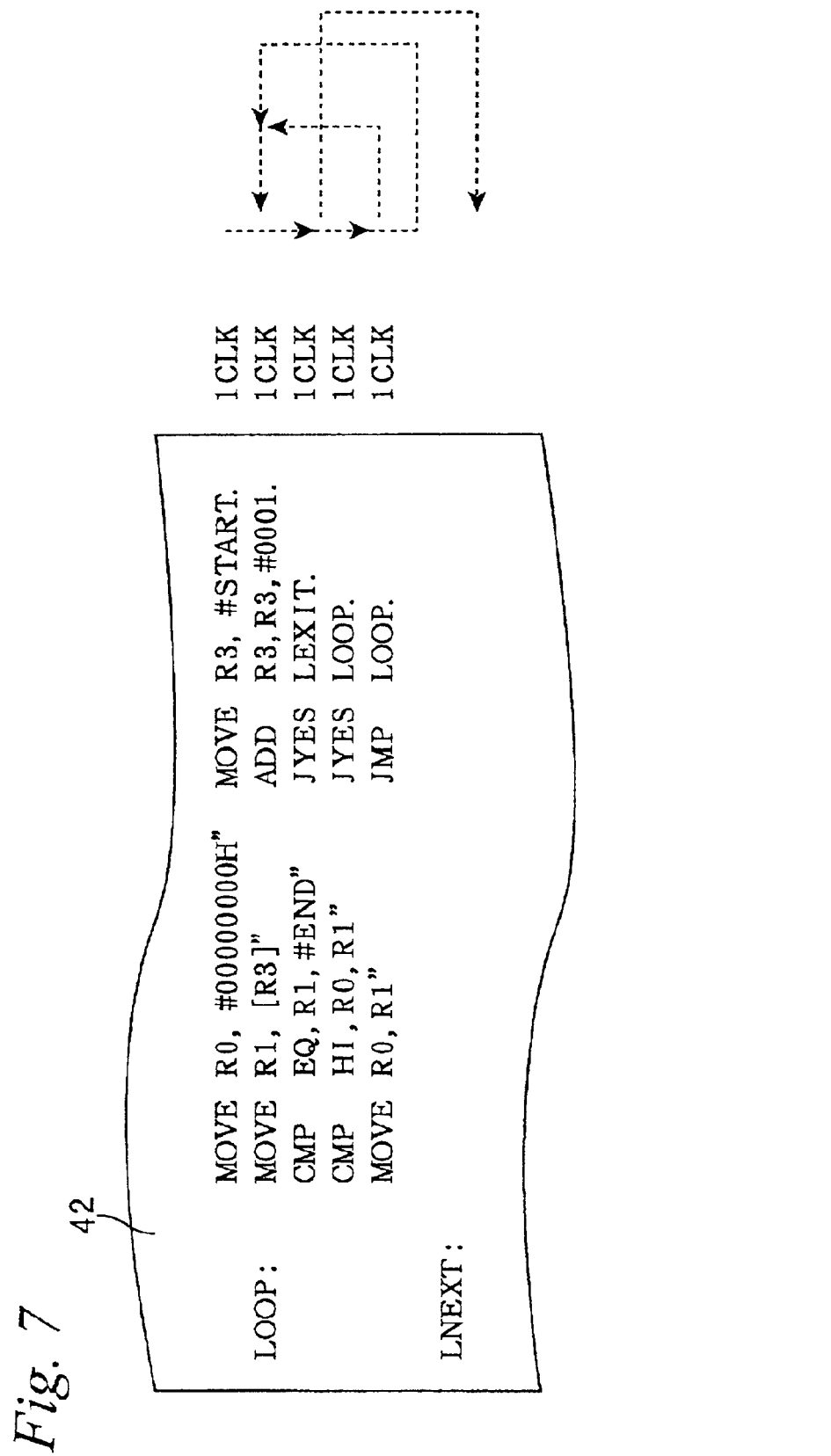
FIG. 7 illustrates a program of the data processing system according to the present invention.

A program 42 shown in FIG. 7 corresponds to the same procedure as that of FIG. 6, the program is converted to the one suitable for the control unit 30 for executing the instruction sets of the present invention. The program 42 is generated for executing two instructions with a single instruction set. The program shown in FIG. 7 is converted through a compiler into an execution program of the instruction sets of the present invention so as to be executed by the control unit 30.

Figure 8:
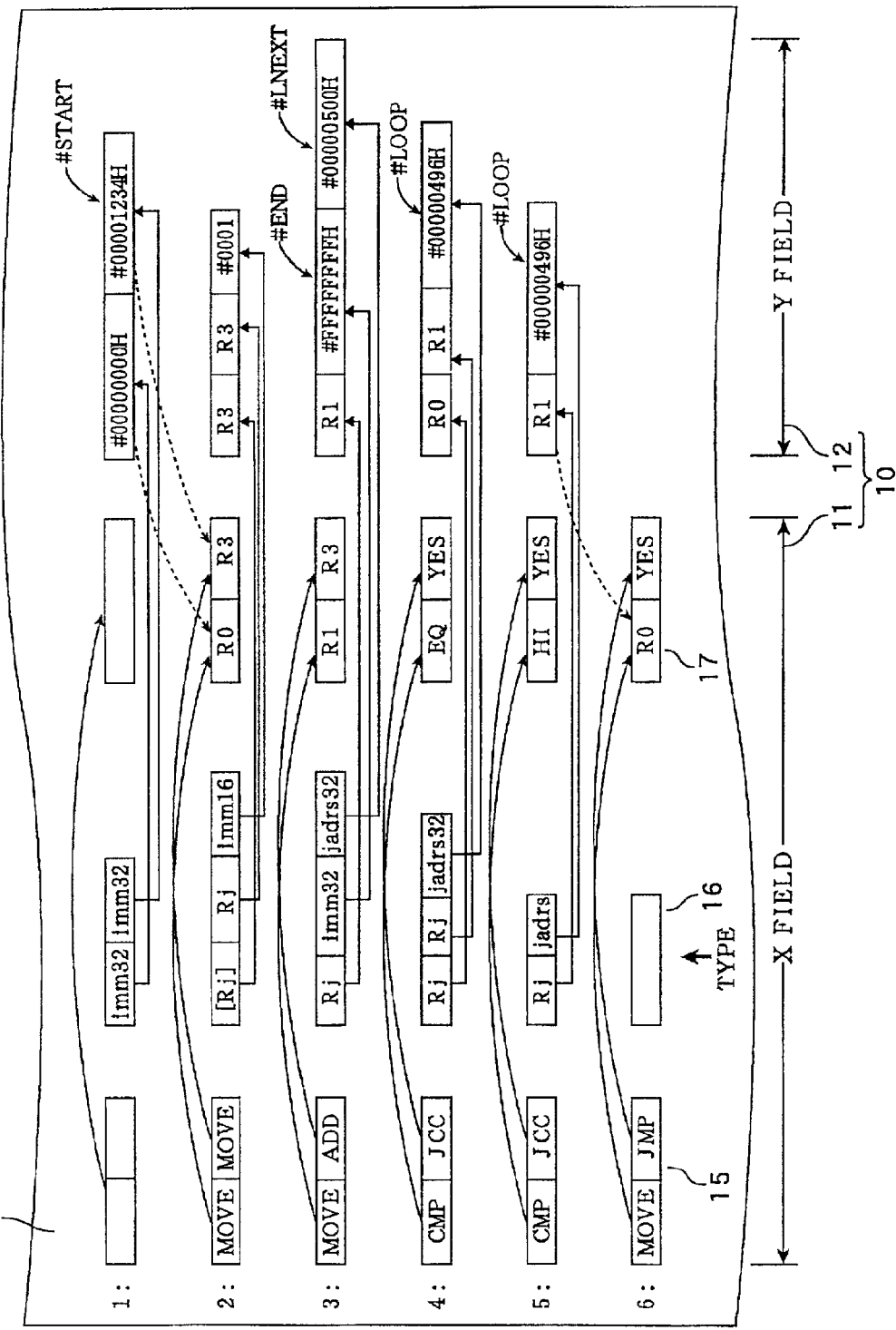
FIG. 8 illustrates compiled program of the program of FIG. 7 using instruction sets of the present invention.

FIG. 8 shows the complied program 43. It is well understood in the programs 43 with reference to the program 42, preparation for the execution instructions 15 of the second instruction set 10 is made in the Y field 12 of the first instruction set 10. In the first instruction set 10, the type field 16 indicates that immediate is described in the Y field 12 as preparation information. The second execution control unit 23 decodes the Y field 12 and provides the immediate to source caches or registers of the ALU 34. Therefore, by the second instruction set 10, the execution instructions 15 are executed on the ALU 34 that has been ready for those execution instructions. Namely, at the time when the second instruction set 10 is executed, to the registers defined in the destination field 17, the instructions of "MOVE" in the execution instruction field 15 are simply executed.

Thus, according to the instruction set of the present invention, an execution instruction can be separated from a preparation instruction that describes an interface for executing that execution instruction. Moreover, it is possible to perform the preparation instruction described in the instruction set that is fetched prior to the execution instruction Therefore, according to the execution instruction described in each instruction set, only the execution corresponding to an arithmetic operation itself is simply executed, because the data has been read to the source side of the ALU 34. Accordingly, excellent AC characteristics and improved execution frequency characteristics is obtained. Moreover, like the conventional pipeline, although the times or timings of operations with respect to the execution instruction are different from that of the conventional pipeline, operations such as instruction fetching register decoding, and other processings are performed in a stepwise manner. Thus, the throughput is also improved. In addition, the program of this example is capable of describing two instructions in a single instruction set. Therefore, by parallel execution of a plurality of instructions near the program counter like VLIW, the processing speed is further improved.

Moreover, in this program 43, conditional branching is described in the execution instruction field 15 of the fourth instruction set, and the address of subject branch destination is described in the Y field 12 of the preceding third instruction set. Accordingly, the address of the branch destination is set to the fetch register upon or before execution of the fourth instruction set. Thus, when the branch conditions are satisfied, the instruction set at the branch destination is fetched and/or executed without any penalty. It is also possible to pre-fetch the instruction at the branch destination, so that preparation for executing the execution instruction at the branch destination can be made in advance. Accordingly, even the instruction at the branch destination is executed without loss of even one clock. Thus, the processing is accurately defined on a clock-by-clock basis.

Figure 9:
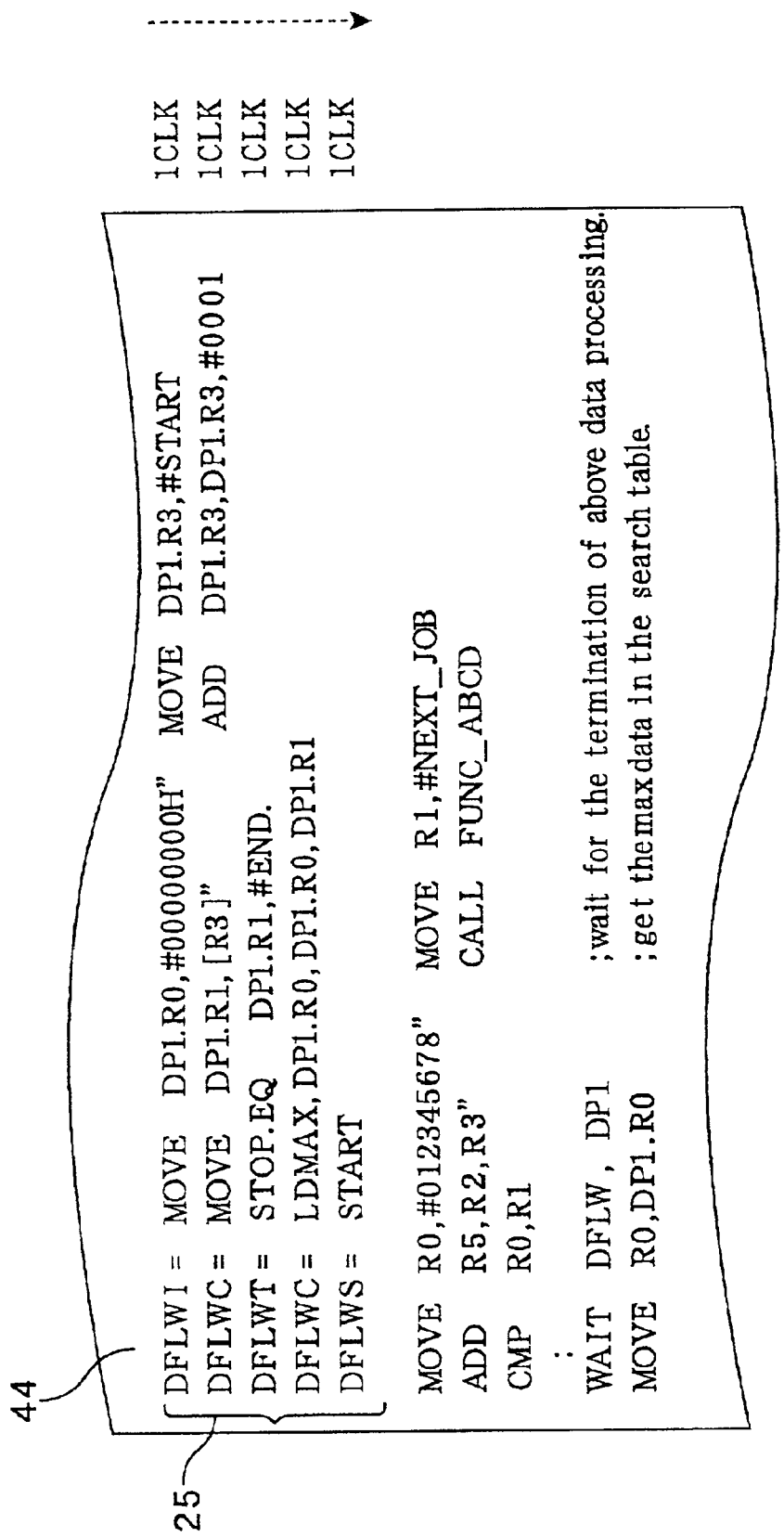
FIG. 9 illustrates another program of the data processing system according to the present invention.

FIG. 9 shows a program 44 of the present invention, which describes the data flow designation instructions 25 using the Y fields 12 of the instruction sets 10. A program product 18 having such data flow designation instructions 25 is provided in the form stored or saved in the ROM 39, RAM, or another appropriate recording medium readable with a data processing system. Moreover, the program product 44 or 18 embedded in a transmission medium that is exchanged in a network environment may also be distributed.

Among the data flow designation instructions 25 described in this program 44, "DFLWI" is an instruction for initializing a data flow, and "DFLWC" is an instruction defining information of connections (information of interfaces) and processing content (function) of the arithmetic processing unit 34 forming the data flow (data path). "DFLWT" is an instruction defining the termination conditions of the data flow. Instruction located the end, "DFLWS" is for inputting data to the data flow thus defined and actuate the processing of the data path. These data flow designation instructions 25 are described in the Y field 12 as preparation information and decoded by the second execution control unit 33, so that the structures (configurations) for conducting the data processes are set by the processing units 34.

Upon executing the program 44 shown in FIG. 9, the second execution control unit 33 functions as a data flow designation unit according to the data flow designation instruction of the program, and the control according to the data flow designation step is performed. More specifically, the second execution control unit 33 decodes the data flow designation instruction 25 fetched by the fetch unit 31 and sets the input and/or output interfaces of a processing unit 34 independent of the time or timing of execution of that processing unit 34. In addition, depending on the data flow designation instruction 25, the second execution control unit 33 defines or changes the processing content of the processing unit 34 as well. Moreover, the second execution control unit 33 also functions as a scheduler 36 so as to manage the schedule retaining the interfaces of each processing unit 34.

Figure 10:
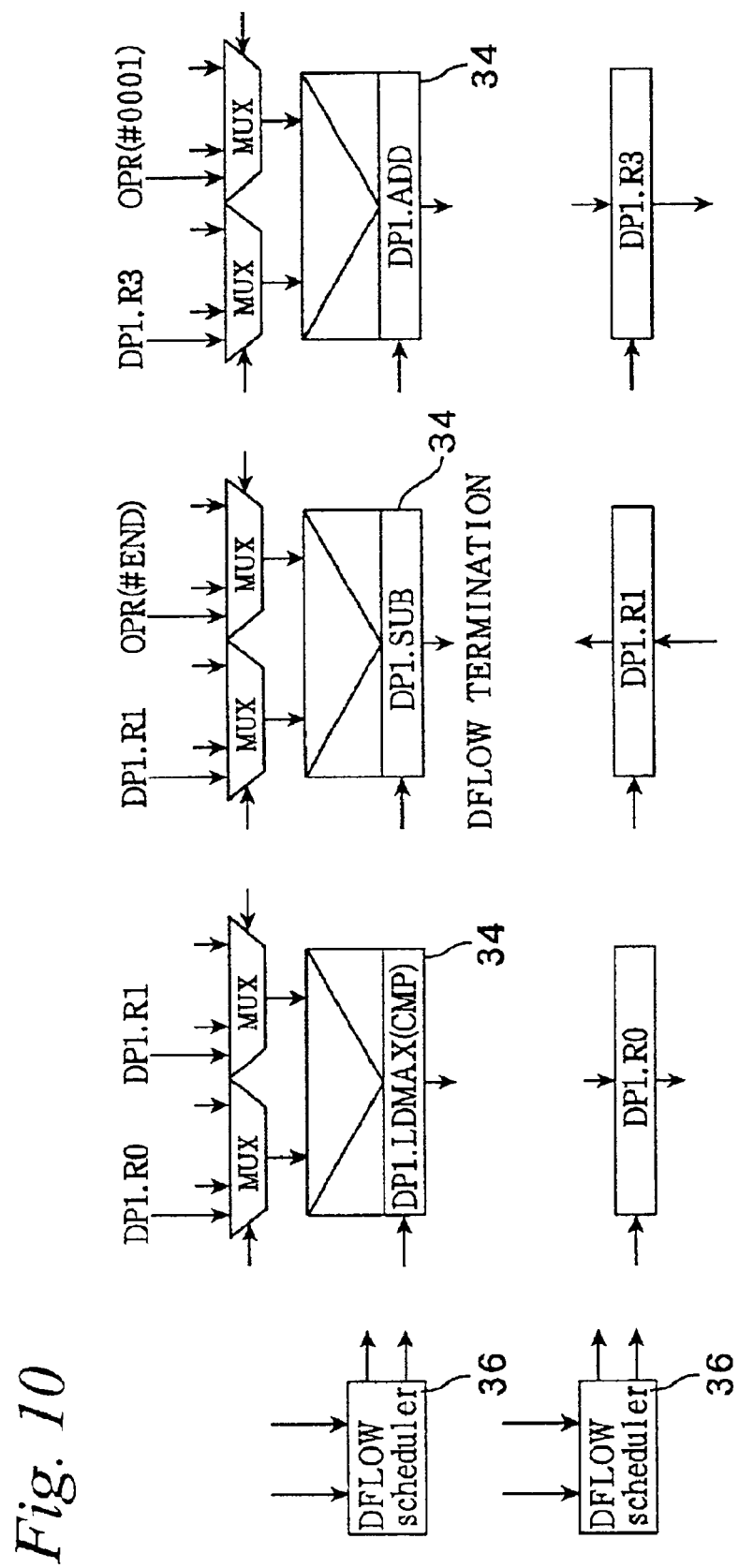
FIG. 10 illustrates data flows configured by the program of FIG. 9.

Accordingly, as shown in FIG. 10, the second execution control unit 33 functioning as scheduler 36 defines the respective interfaces (input/output) and processing contents or functions of three arithmetic processing units 34, and retains that state or configuration until the termination conditions are satisfied. Accordingly, through the data flow or data path configured with these arithmetic processing units 34, the same process as that shown in FIG. 6 proceeds in sequence independent of the program counter. In other words, by designating the data flow, dedicated circuitry for that process is provided in advance in the control unit 30 by the three arithmetic processing units 34. Thus, the process of obtaining the maximum value is executed independent of the control of the program counter. The data flow is terminated if the ALU 34 functioning as DP1.SUB judges that DP1.R1 corresponds to Thus, as shown in FIG. 9, definition of the data flow enables the same process as that of the program shown in FIG. 6 or 7 to be executed without using any branch instruction. Accordingly, although the control unit 30 is a general-purpose control unit, the control unit 30 can efficiently perform specific processes at an extremely high speed like a control unit having dedicated circuitry for each specific process.

Using the instruction set and the control unit according to the present invention, it is possible that data flows or pseudo data flows for various processings are provided in the control unit Also, it is possible to apply these data flows, as templates, to other processings or programs. This means that, by software, the hardware becomes able to be modified or changed at any time to the configuration suitable for the specific data processing, and the resultant hardware configuration can be implemented also by other programs and/or in other hardware. It is also possible to set a plurality of such data flows, so that a multi-command stream can be defined in the control unit using software. This significantly facilitates parallel execution of a plurality of processings or processes, and it becomes possible to arbitrarily control their execution contents by programming.

Figure 11:
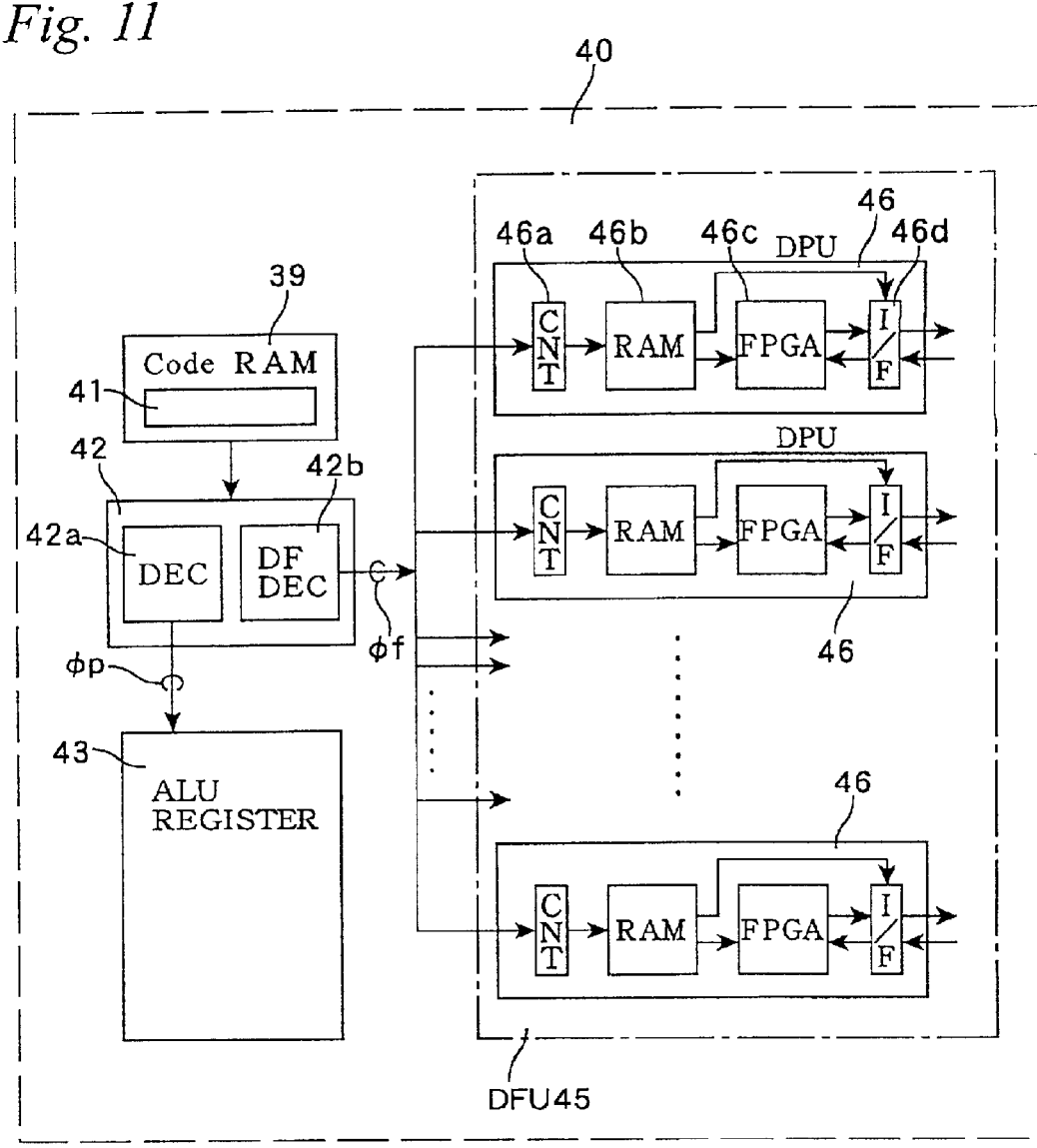
FIG. 11 shows a different example of the data processing system capable of designating a data flow.

FIG. 11 shows a different embodiment of the data processing system capable of being controlled by the program 41 having the data flow designation instructions 25. This data processing system 40 is provided as a system LSI and includes a code RAM 39 having the program 41 recorded thereon, and a fetch unit 42 capable of fetching an instruction from the code RAM 39. The fetch unit 42 of this embodiment includes a data flow decoder (DFDEC) 42b for decoding a fetched data flow designation instruction 25, and a decoder 42a for decoding a general instruction other than the data flow designation instructions 25. Accordingly, the program 41 controlling this data processor 40 may include both the data flow designation instructions 25 and other general-purpose instructions. Alternatively, a program including the data flow designation instructions 25 and a program formed from other general-purpose instructions are provided in the code RAM 39 so that the instructions from these programs are fetched while synchronizing them by an appropriate method.

The general-purpose instruction is decoded by the general-purpose decoder 42a, and the decode signal φp is supplied for execution to an embedded general-purpose processor 43 including ALUS, registers and the like. On the other hand, the data flow designation instruction 25 is decoded by the DFDEC 42b, and the decode signal φf is supplied to a data flow processing unit (DFU) 45 for performing the instructions.

The DFU 45 of this embodiment comprises a plurality of data processing units (DPU) 46. Each DPU 46 is a reconfigurable processing unit having data path(s) formed by the respective FPGA Accordingly, the DPU 46 includes an FPGA 46c, a RAM 46b or ROM having mappings of the FPGA 46c stored therein, an interface 46d for controlling data input/output to/from the FPGA 46c, and a configuration control portion 46a for supplying the mapping information and interface information stored in the RAM 46b to the FPGA 46c and interface 46d so as to define their configurations or states.

In this data processor 40, the fetch unit 42 conducts the step of fetching an instruction set including the data flow designation instruction, and the DFDEC 42b functions as the data flow designation unit and performs control process including the data flow designation step. In other words, the DFDEC 42b decodes the data flow designation instruction so as to designate the interface 46d of the DPU 46 through the configuration control portion 46a of each DPU 46 of the DFU 45. Accordingly, the data flow designation instruction 25 allows for control of the connection of the DPUs 46 in the DFU 45, so that data path(s) formed from a plurality of DPUs 46 are configured and/or controlled flexibly at the program level.

Figure 12B:
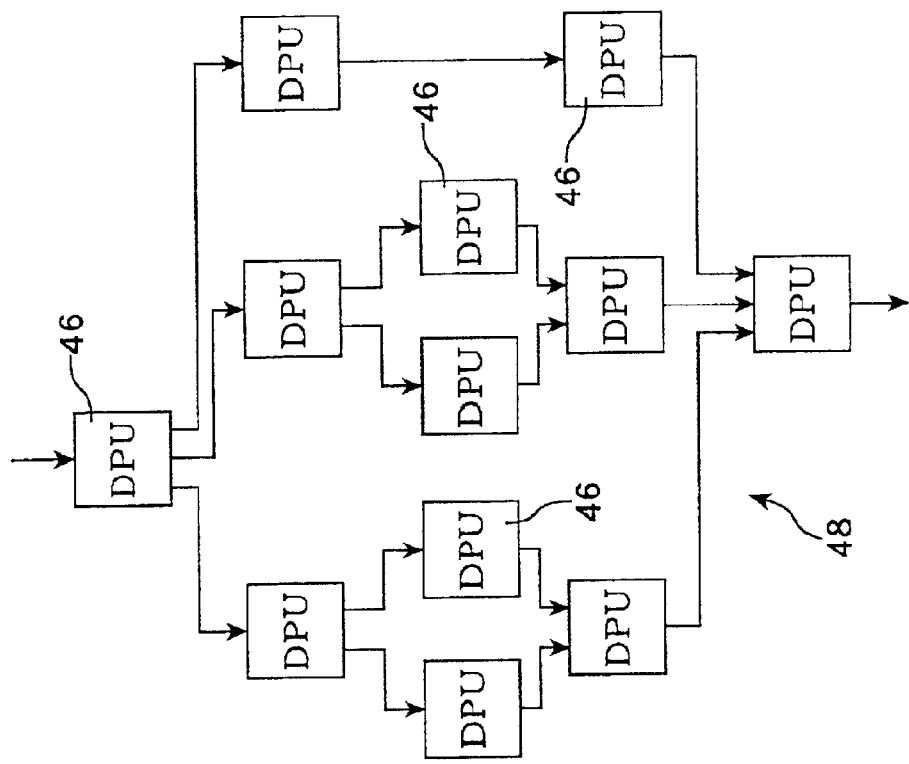
FIG. 12 shows how data path is changed.
Figure 12A:
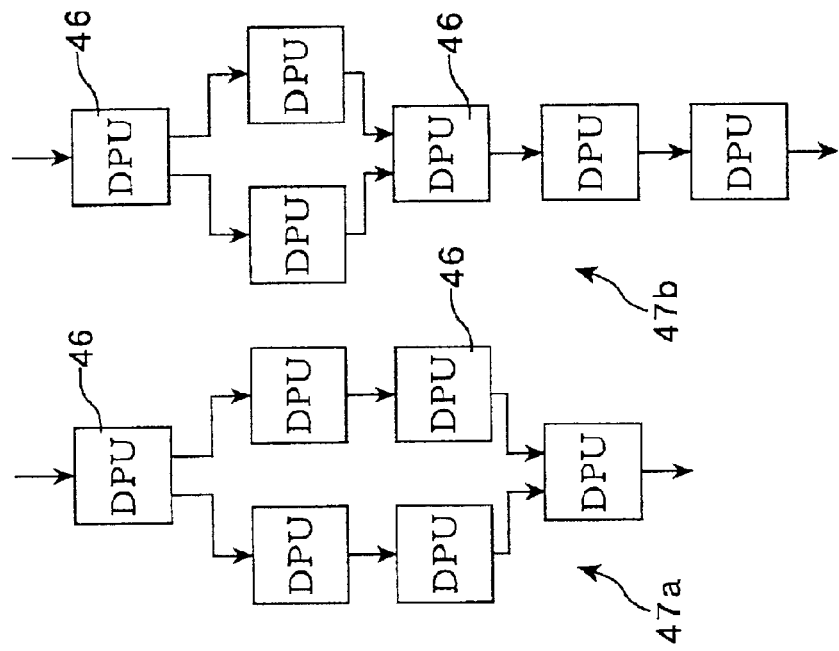

In FIG. 12(a), two data paths 47a and 47b are configured from twelve DPUs 46. In contrast, by changing the interfaces of the DPUs 46, another single data path 48 capable of executing another data process different from that of FIG. 12(a) is configured from twelve DPUs 46, as shown in FIG. 12(b). Data paths configurable from a plurality of DPUs 46 is not limited to this, and three or more data paths are possibly defined in the DFU 45 of the data processor 40 by the software using the data flow designation instructions. As a result parallel execution of a plurality of processes is significantly simplified. Moreover, if any DPU(s) 46 is available, another appropriate data path can be configured therewith for use in another data processor.

Moreover, the processing of combining the DPUs 46 to configure, reconfigure or change the data path can be conducted without discontinuing the data processing in another data path, or without discontinuing the processing in the embedded processor 43. Moreover, without changing of the processing in the FPGA 46c, dynamic changing of the data path becomes possible by merely changing the setting of the interface 46d. Moreover, in the case of changing the processing content of (processing itself in) the DPU 46, the time required for re-mapping is reduced by employing the FPGA 46c having a somewhat small circuit scale. Accordingly, a program can flexibly configure data paths corresponding to the data processes of the application to be processed by the data processing system 40, and that data processes are executed at an extremely high speed. In the current FPGA, however, the hardware is not enough to conduct mapping in several to several tens of clocks as described above. Therefore, in order to execute a desired data flow processing, instruction thereof must be made about several or several tens of clocks before the execution, thereby increasing the limitations like requirement for consistency with the start of the data processing and with branch instructions in describing the data flow designation instructions in the program.

Figure 13:
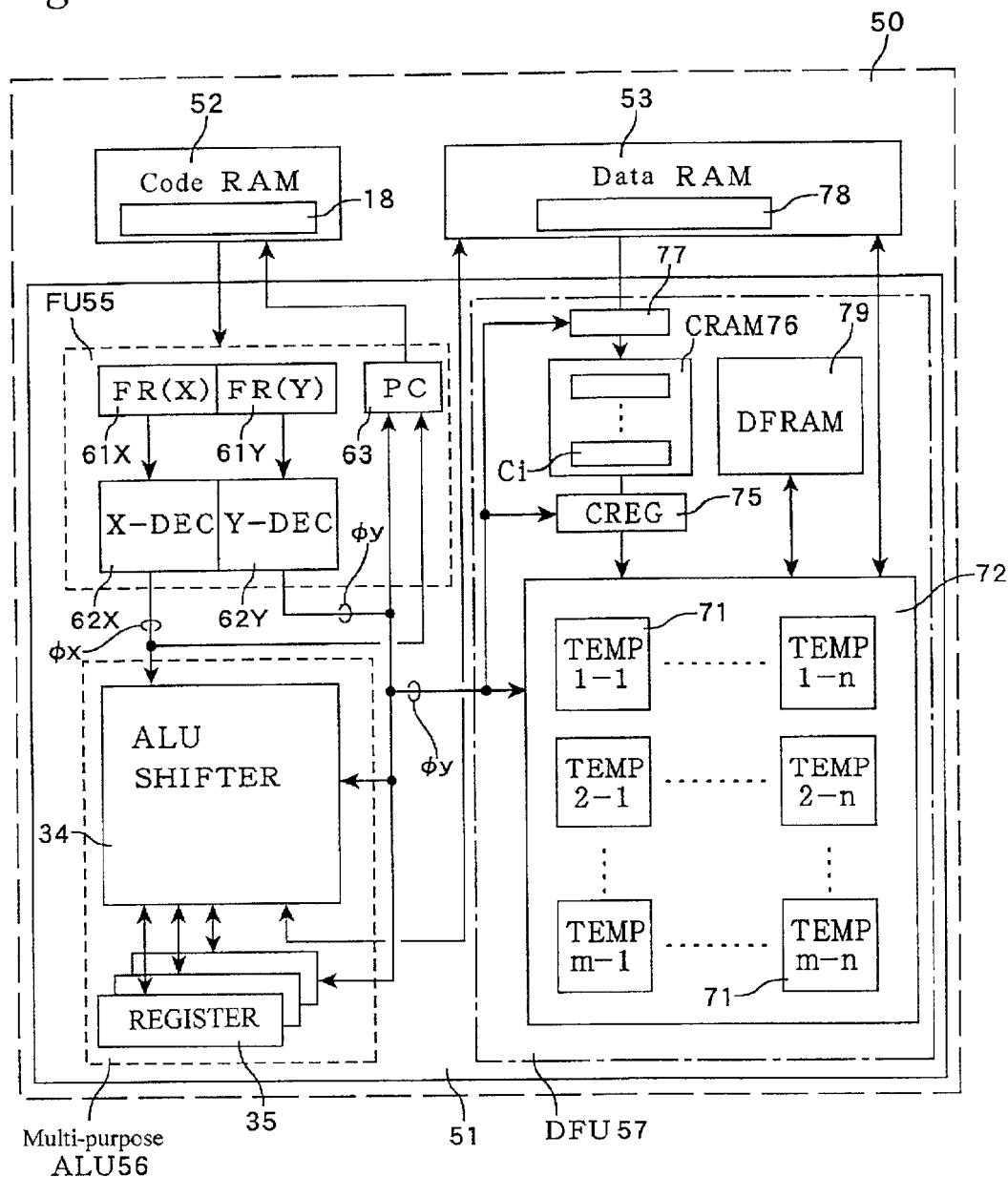
FIG. 13 shows the schematic structure of a further different data processing system capable of executing data processing according to the instruction set of the present invention.

FIG. 13 is a schematic structure of a data processing system provided as a system LSI 50, having a plurality of processing units (templates) capable of defining a data flow by the instruction set 10 including the X field 11 and Y field 12 of this invention. This system LSI 50 includes a processor section 51 for conducting data processings, a code RAM 52 storing a program 18 for controlling the processings in the processor region 51, and a data RAM 53 storing other control information or data of processing and the RAM 53 becomes a temporal work memory. The processor section 51 includes a fetch unit (FU) 55 for fetching a program code, a general-purpose data processing unit (multi-purpose ALU, first control unit) 56 for conducting versatile processing, a data flow processing unit (DFU, second control unit) 57 capable of processing data in a data flow scheme.

The LSI 50 of this embodiment decodes the program code that includes a set of X field 11 and Y field 12 in the single instruction set 10 and executes the processing accordingly. The FU 55 includes a fetch register (FR(X)) 61x for storing instruction in the X field 11 of the fetched instruction set 10, and a fetch register (FR(Y)) 61y for storing instruction in the Y field 12 thereof The FU 55 further includes an X decoder 62x for decoding the instruction latched in the FR(X) 61x, and a Y decoder 62y for decoding the instruction latched in the FR(Y) 61y. The FU.55 further includes a register (PC) 63 for storing an address of the following instruction set according to the decode result of these decoders 62x and 62y, and the PC 63 functions as a program counter. The subsequent instruction set is fetched at any time from a predetermined address of the program stored in the code RAM 52.

In this LSI 50, the X decoder 62x functions as the aforementioned first execution control unit 32 and the Y decoder 62y functions as the second execution control unit 33, i.e., the data flow designation unit. Accordingly, the Y decoder 62y conducts the data flow designation step of the present invention of decoding the data flow instruction described in the Y field 12 of the instruction set 10, and based on the decoding, setting the input/output interfaces of the processing units of the DFU 57 so as to configure the appropriate data path. Thus, in the control method of the data processor 50 shown in FIG. 13, the fetch unit 55 conducts the step of fetching a data flow designation instruction 25 that designates the input/output interface of the processing unit independently of the time or timing of execution of that processing unit. The Y decoder 62y conducts the data flow designation step of decoding the data flow designation instruction 25 and setting the input and/or output interfaces of the processing units so as to configure the data path from a plurality of processing units.

The multi-purpose ALU 56 includes the arithmetic unit (ALU) 34 as described in connection with FIG. 5 and a register group 35 for storing input/output data of the ALU 34. Provided that the instructions decoded in the FU 55 are the execution instruction and/or preparation information of the ALU 34, a decode signal φx of the X decoder 62x and a decode signal φy of the Y decoder 62y are supplied respectively to the multi-purpose ALU 56, so that the described processing is performed in the ALU 34 as explained above.

The DFU 57 has a template section 72 where a plurality of templates 71 for configuring one of a plurality data flows or pseudo data flows for various processings are arranged. As described above in connection with FIGS. 9 and 10, each template 71 is the processing unit (processing circuit) having a function as a specific data path or data flow, such as the arithmetic-processing unit (ALU). When the Y decoder 62y decodes the data flow designation instructions 25 described as preparation information in the Y field 12, the respective interfaces and contents of function of processing in the templates 71, i.e., the processing units of the DFU 57, are set based on the signal φy.

Accordingly, it is possible to change the respective connections of the templates 71 and processes in that templates 71 by the data flow designator 25 described in the Y field 12. Thus, with combination of these templates 71, data path(s) suitable for the specific data processing is flexibly configured in the template region 72 by means of the data flow designator included in the program 18. Thus, dedicated circuitry(s) for the specific processing is provided in the processor 51, whereby the processing therein is conducted independently of the control of the program counter. In other words, since the data flow designation instructions 25 are able to change the respective inputs/outputs of the templates 71 and processes in the templates 71 by software, the hardware of the processor 51 is modified or reconfigured at any time to the configuration suitable for the specific data processing.

As shown in FIG. 14(a), in order to perform some process on the input data φin to getting the output data φout by the DFU 57 of this processor 51, it is possible to set the respective interfaces of the templates 71 by the data flow designator 25 so that the data processing is performed with the templates 1-1, 1-2 and 1-3 being connected in series with each other as shown in FIG. 14(b). Similarly, for the other templates 71 in the template block 72, it is possible to set their respective interfaces so as to configure data paths or data flows with appropriate combinations of a plurality of templates 71. Thus, a plurality of dedicated or special processing units or dedicated data paths 73 that are suitable for processing the input data φin are configured at any time in the template section 72 by means of the program 18.

On the other hand, in the case where the process for performing on the input data φin is changed, it is possible to change the connection between the templates 71 by the data flow designation instructions 25, as shown in FIG. 14(c). The Y decoder 62y decodes the data flow designation instructions 25 so as to change the respective interfaces of the corresponding templates 71. Such control process (data flow designating step) of the Y decoder 62y enables one or a plurality of data paths 73 suitable for executing another different processings to be configured in the template section 72 with the templates 1-1, 2-n and m-n being connected in series with each other.

These templates 71 are not limited to be combined as shown in FIG. 14, but may also be combined as shown in FIG. 12. The single processing unit formed from a single template 71 or combination of a plurality of templates 71 can also be assigned to another processing or another program that is executed in parallel. In the case where a plurality of processors 51 are connected to each other through an appropriate bus, it is also possible to configure a train (data path) 73 having the templates 71 combined for a data processes that is mainly performed by another processor 51, thereby making it possible to make use of the data processing resources, i.e., the templates 71, extremely effectively.

Moreover, unlike the FPGA intended to cover even implementation of a simple logic gate such as "AND" and "OR", the template 71 of the present invention is a higher-level data processing unit including therein some specific data path which basically has a function as ALU or other logic gates. The respective interfaces of the templates 71 are defined or redefined by the data flow designation instructions 25 so as to change the combination of the templates 71. Thus, a larger data path suitable for desired specific processing is configured. At the same time, the processing content or processing itself performed in the templates 71 can also be defined by the data flow designation instructions 25 changing the connection of the ALU or other logic gates or the like within the template 71. Namely, the processing content performed in the templates 71 are also defined and varied by selecting a part of the internal data path in the template 71.

Accordingly, in the case where the hardware of the DFU 57 having a plurality of templates 71 of this example arranged therein is reconfigured for the specific data processing, re-mapping of the entire chip as in the FPGA or even re-mapping on the basis of a limited logic block is not necessary. Instead, by switching the data paths previously provided in the templates 71 or in the template section 72, or by selecting a part of the data paths, the desired data paths are implemented using the ALUs or logic gates prepared in advance. In other words, within the template 71, connections of the logic gates are only reset or reconfigured within a minimum requirement, and even between the templates 71, the connections are only reset or reconfigured within a minimum required range. This enables the hardware to be changed to the configuration suitable for the specific data processing in a very short or limited time, in units of clock.

Since FPGA incorporates no logic gate, they are extremely versatile. However, FPGA include a large number of wirings that are unnecessary to form logic circuitry for implementing functions of a specific application, and such redundancy hinders reduction in length of signal paths. FPGA occupies a larger area than that of an ASIC that is specific to the application to be executed, and also have degraded AC characteristics. In contrast, the processor 51 employing the templates 71 of this embodiment which incorporate appropriate logic gates in advance is capable of preventing a huge wasteful area from being produced as in the FPGA, and also capable of improving the AC characteristics. Accordingly, the data processing unit 57 in this embodiment based on the templates 71 is a reconfigurable processor capable of changing the hardware by means of a program. Thus, in this invention, it is possible to provide the data processing system having both a higher-level flexibility of software and higher-speed performance of hardware compared to a processor employing FPGAs.

Appropriate logic gates are incorporated in these templates 71 previously, therefore, the logic gates required for performing the specific application are implemented at an appropriate density. Accordingly, the data processing unit using the templates 71 is economical. In the case where the data processor is formed from FPGA, frequent downloading of a program for reconfiguring the logic must be considered in order to compensate for reduction in packaging density. The time required for such downloading also reduces the processing speed. In contrast, since the processor 51 using the templates 71 has a high packaging density, the necessity of compensating for reduction the density is reduced, and frequent reconfiguration of the hardware is less required. Moreover, reconfigurations of the hardware are controlled in the units of clock. In these respects, it is possible to provide a compact, high-speed data processing system capable of reconfiguring the hardware by means of software that is different from the FPGA-based reconfigurable processor.

Moreover, the DFU 57 shown in FIG. 13 includes a configuration register (CREG) 75 capable of collectively defining or setting the respective interfaces and content of processings (hereinafter referred to as configuration data) of the templates 71 arranged in the template section 72, and a configuration RAM (CRAM) 76 storing a plurality of configuration data Ci (hereinafter, i represents an appropriate integer) to be set to the CREG 75. An instruction like "DFSET Ci" is provided as an instruction of the data flow designators 25. When the Y decoder 62y decodes this instruction, desired configuration data among the configuration data Ci stored in the CRAM 76 is loaded into the CREG 75. As a result, configurations of the plurality of templates 71 arranged in the template section 72 are changed collectively. Alternatively, configuration may be changed on-the-basis of a processing block formed from a plurality of templates 71.

It is also possible to set or change the configuration of the individual template 71 when the Y decoder 62y decodes the data flow designation instruction 25 such as DFLWI or DFLWC explained above. In addition, as mentioned above, since the DFU) 57 is capable of changing, with a single instruction, the configurations of a plurality of templates 71 that requires a large amount of information, the instruction efficiency is improved as well as the time expended for reconfiguration is reduced.

The DFU 57 further includes a controller 77 for downloading the configuration data into the CRAM 76 on a block-by-block basis. In addition, "DFLOAD BCi" is provided as an instruction of the data flow designator 25. When the Y decoder 62y decodes this instruction, a number of configuration data Ci for the ongoing processing or the processing that would occur in the future are previously downloaded into the configuration memory, i.e., the CRAM 76, among a large number of configuration data 78 prepared in advance in the data RAM 53 or the like. By this structure, a small-capacity and high-speed associative memory or the like is able to be applied as the CRAM 76 and the hardware becomes reconfigured flexibly and further quickly.

Figure 15:
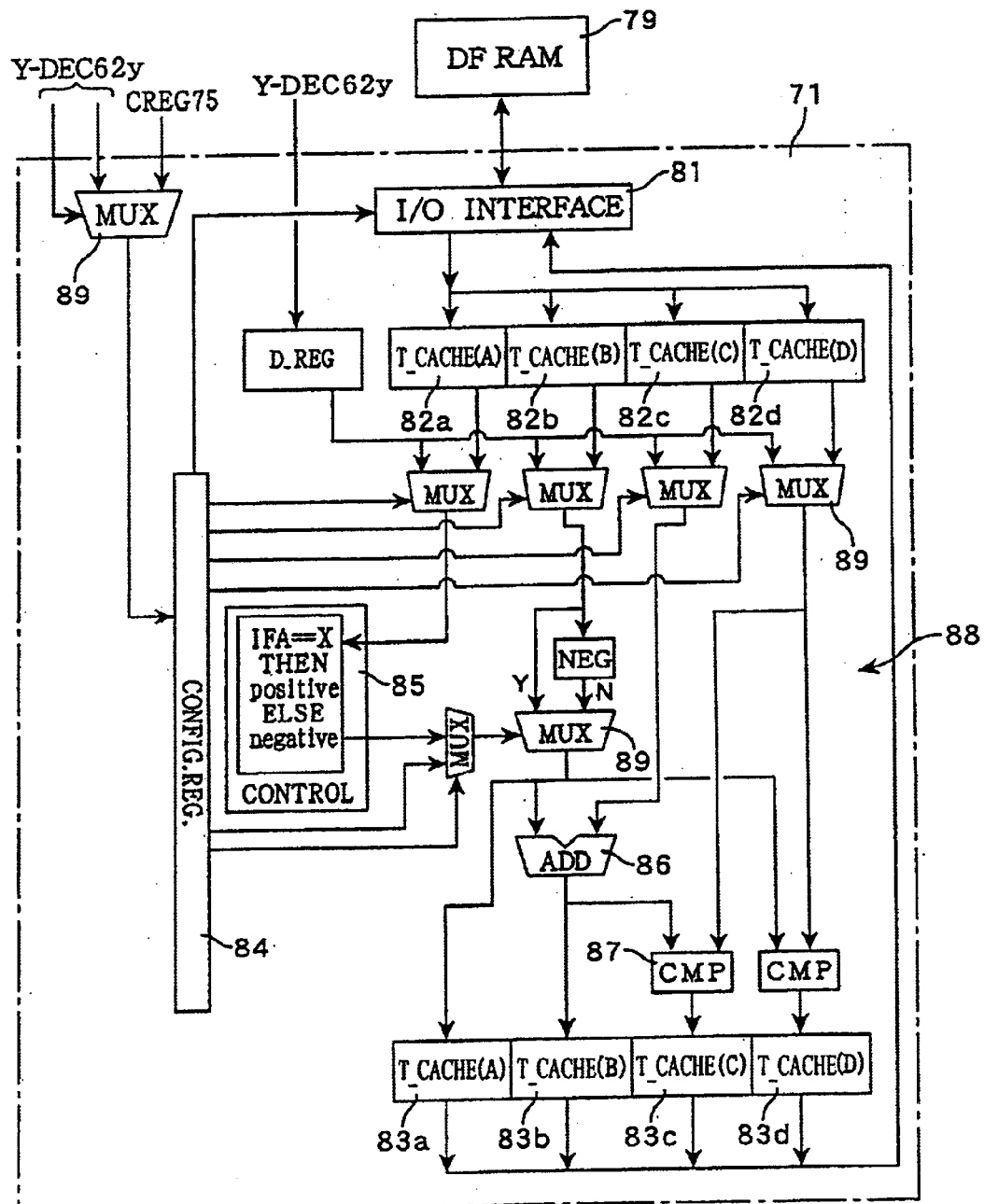
FIG. 15 illustrates one of the templates.

FIG. 15 shows an example of the template 71. This template 71 is capable of exchanging the data with another template 71 through a data flow RAM (DFRAM) 79 prepared in the DFU 57. The processing result of another template 71 is input through an I/O interface 81 to input caches 82a to 82d, and then are processed and output to output caches 83a to 83d. This template 71 has a data path 88 capable of performing the following processing on data A, B, C and D respectively stored in the input caches 82a to 82d, and of storing the operation result in the output cache 83b and storing the comparison result in the output cache 83c. The processing result of the template 71 is again output to another template through the I/O interface 81 and DFRAM 79.

IF A=?

THEN (C+B)=D

ELSE (C−B)=D  (A)

This template 71 has its own configuration register 84. The data stored in the register 84, in this template 71, controls a plurality of selectors 89 so as to select a signal to be input to the logic gates such as control portion 85, adder 86 and comparator 87. Accordingly, by changing the data in the configuration register 84, in the template 71, another processing using a part of the data path 88 is possible to proceed. For example, in the template 71, the following processing is also provided without using the control portion 85.

(B+C)=D (B−C)=D  (B)

Similarly, by changing the data in the configuration register 84, a part of the data path 88 can be used so that the template 71 is utilized as a condition determination circuit using the control portion 85, an addition/subtraction circuit using the adder 86, or a comparison circuit using the comparator 87. These logic gates are formed from dedicated circuitry that is incorporated in the template 71, therefore there is no wasteful parts in terms of the circuit structure and the processing time. In addition, it is possible to change the input and output data configurations to/from the template 71 by the interface 81 that is controlled by the configuration register 84. Thus, the template 71 becomes all or a part of the data flow for performing the desired data processing.

This template 71 is also capable of rewriting the data in its own configuration register 84, based on either one of the data from the aforementioned CREG 75 and the data from the Y decoder (YDEC) 62y of the FU 55 functioning as data flow designation unit, and selection thereof is controlled by a signal from the Y decoder 62y. Namely, configuration of this template 71 is controlled by the Y decoder 62y or the data flow designation step performed in the Y decoder 62y according to the data flow designation instructions 25. Therefore, both reconfiguration of hardware are possible, the one is to change the hardware configuration of the template 71, based on the DFSET instruction or the like, together with another template(s) according to the configuration data Ci stored in the CRAM 76; and another is to select a part of the specific data path 88 of the template 71 by the data in the configuration register 84 set by the data flow designation instruction 25.

Accordingly, configuration of the templates 71 is changed by the data flow designation instructions 25 either individually or in groups or blocks, whereby the data path of the processor 51 is flexibly reconfigured.

The structure of the template 71 is not limited to the above embodiment. It is possible to provide appropriate types and number of templates having logic gates for combining, selecting a part of inner data-path, and changing the combination of the templates 71 or performing a multiplicity of data processings. More specifically, in the present invention, somewhat compact data paths are provided as several types of templates. Thus, by designating combination of the data paths, the data-flow-type processings are implemented thereby the specific processings are performed in an improved performance condition. In addition, any processing that cannot be handled with the templates is performed with the functions of the multi-purpose ALU 56 of the processor 51. Moreover, in the multi-purpose ALU 56 of this processor, the penalty generated upon branching and others, is minimize by the preparation instructions described in the Y field 12 of the instruction set 10. Therefore, the system LSI 50 incorporating the processor 51 of this embodiment makes it possible to provide a high-performance LSI capable of changing the hardware as flexibly as describing the processing by programs, and it is suitable for high-speed and real-time processing. This LSI also flexibly deals with a change in application, specification without reduction in processing performance resulting from the change in specification.

In the case where the summary of the application to be executed with this system LSI 50 is known at the time of developing or designing the system LSI 50, it is possible to configure the template section 72 mainly with the templates having configuration suitable for the processing of that application. As a result, an increased number of data processings can be performed with the data-flow-type processing, thereby improving the processing performance. In the case where a general-purpose LSI is provided by the system LSI 50, it is possible to configure the template section 72 mainly with the templates suitable for the processing that often occurs in a general-purpose application such as floating-point operation, multiplication and division, image processing or the like.

Thus, the instruction set and the data processing system according to the present invention make it possible to provide an LSI having a data flow or pseudo data flow performing various processings, and by using a software, the hardware for executing the data flow can be changed at any time to the configuration suitable for a specific data processing Moreover, the aforementioned architecture for conducting the data-flow-type processing by combination of the templates, i.e., the DFU 52 or template region 72, can be incorporated into the control unit or the data processing system such as processor independently of the instruction set 10 having the X field 11 and Y field 12. Thus, it is possible to provide a data processing system capable of conducting the processing at a higher speed, changing the hardware in a shorter time, and also having better AC characteristics, as compared to the FPGA.

It is also possible to configure a system LSI that incorporates the DFU 57 or template region 72 together with a conventional general-purpose embedded processor, i.e., a processor operating with mnemonic codes. In this case, any processing that cannot be handled with the templates 71 may be conducted with the general-purpose processor. As described above, however, the conventional processor has the problems such as branching penalty and wasting of clocks for preparation of registers for arithmetic processing. Accordingly, it is desirable to apply the processor 51 of this embodiment capable of decoding the instruction set 10 having the X and Y fields for execution. 1Moreover, with the processor 51 and instruction set 10 of this embodiment, configurations of the DFU 57 are set or changed before execution of the data processing, in parallel with another processing by the Y field 12. This is advantageous in terms of processing efficiency and program efficiency. The program efficiency is also improved by describing a conventional mnemonic instruction code and data-flow-type instruction code into a single instruction set. The function of the Y field 12 of the instruction set 10 of this embodiment is not limited to describing the data-flow-type instruction code as explained above.

The processor according to the present invention is capable of changing physical data path configuration or structure by the Y field 12 prior to execution. In contrast, in the conventional processor, a plurality of multiprocessors are connected to each other only through a shared memory. Therefore, even if there is a processor in the idle state, the internal data processing unit of that processor cannot be utilized from the outside. In the data processor according to the present invention, setting an appropriate data flow enables an unused hardware in the processor to be used by another control unit or data processor.

As secondary effects, in the control unit of the present invention and the processor using the same, efficiency of the instruction execution sequence is improved, as well as independence and improved degree of freedom (availability) of the internal data path is ensured, therefore, the processings are successively executed as long as the executing hardware are available, even if instruction sequences for the processings having contexts of completely different properties are simultaneously supplied.

Now, the advantages of the cooperative design of hardware and software becomes point out flourishingly, and the combination of the instruction set and the control unit of the present invention becomes an answer to the question how algorithms and/or data processes requested by the user are implemented in efficient and economical manner within the allowable hardware costs. For example, based on both the data and/or information relating to the instruction set of the present invention (the former DAP/DNA) reflecting configurations of the data paths those are already implemented, and to the hardware and/or sequence subsequently added for executing the process, new type of combination that is corresponding to the new data path (data flow) described with software, becomes most optimal solutions for the process and contributes for improving performance are led while minimizing the hardware costs.

In the conventional hardware, configuration is less likely to be divided into elements. Therefore, there is no flexibility in combination of the elements, and basically, the major solution for improving performance is to add a single new data path. Therefore, the conventional architecture is hard to evaluate numerically either in terms of accumulating some information for improving performance or of adding hardware information actually implemented for realizing the required improved performance, thereby making it difficult to create a database. In contrast, according to the present invention, since compact data paths are provided as templates and combination of the data paths is designated so as to conduct the data-flow-type processing, cooperation between hardware and software becomes easily estimated in an extremely meticulous manner for improving performance. It is also possible to accumulate trade-off information between hardware and software, therefore, possibility of the combination of data paths may be connected closely with the degree of contribution to the processing performance. This makes it possible to accumulate estimation data relating to the cost, the performance for required processes, and performance for execution those are closely relating to both hardware and software. In addition, since the data paths are implemented without discontinuing execution of the main processing or general-purpose processing, expected result to the addition for the performance request is predicted from the accumulated past data of the hardware and instruction sets of the present invention.

Therefore, the present invention contributes not only to significant reduction in current design and specification costs, but also to completing the next new design with the minimum trade-off between new hardware and software to be added. Moreover, corresponding to the processing type, lending an internal data path to the outside is facilitated, therefore hardware resource sharing becomes possible. Accordingly, parallel processing by a plurality of modules of the present invention (DAP/DNA modules) becomes one of the most useful aspects for implementing compact hardware.

Note that the aforementioned data processing system and instruction set are one of the embodiments of this invention, such that, in the data processor, it is also possible to use an external RAM or ROM instead of the code RAM or data RAM or the like, and to additionally provide an interface with an external DRAM or SRAM or the like. The data processors additionally having known functions as a data processor such as system LSI, e.g., an I/O interface for connection with another external device, are also included in the scope of the present invention. Accordingly, the present invention is understood and appreciated by the terms of the claims below, and all modifications covered by the claims below fall within the scope of the invention.

As has been described above, the present invention allows data path(s) to be flexibly rearranged according to program (s) by changing the respective interfaces of a plurality of processing units according to the data flow designation instructions. This makes it possible to flexibly execute individual complicated data processes with the hardware at a high speed without having various dedicated circuits specifically fixed to the respective data processes. Moreover, by employing as processing units the templates provided with a specific data path, according to the present invention, data paths (data flows) capable of contributing to improved performance can be accumulated with the resources, i.e., the templates and the instruction sets for utilizing the templates. Then, the accumulated data paths become possible to be updated at any time based on subsequently added hardware configuration information and sequence information for performing the data processing, so that the optimal solution is easily obtained. Accordingly, by the present invention, resource sharing between applications, resource sharing in hardware and investment of hardware for improving performance, those are conventional pointed out, will be proceeded in more desirable manner, and this invention will be significantly contributable as technology infrastructure for constructing networked society.

INDUSTRIAL APPLICABILITY

The data processing system of the present invention is provided as a processor, LSI or the like capable of executing various data processings, and is applicable not only to the integrated circuits of electronic devices, but also to the optical devices, and even to the optical integrated circuit devices integrating electronic and optical devices. In particular, a control program including the instruction set of the present invention and data processor are capable of flexibly executing the data processing at a high speed, and are preferable for the processes required to have highspeed performance and real-time performance like the network processing and image processing.

What is claimed is:

1. A program product for controlling a data processing system including a plurality of processing units, comprising a data flow designation instruction for designating input and/or output interfaces of at least one of the processing units independently of timing of execution of the processing unit for defining a data path configured by the processing unit.

2. The program product of claim 1, wherein the data flow designation instruction includes information for defining content of processing of the processing unit.

3. The program product of claim 1, wherein the processing unit includes a specific internal data path, and
   the data flow designation instruction includes information for selecting a part of the internal data path.

4. The program product of claim 1, wherein the data flow designation instruction includes information for defining an input and/or output interfaces in a processing block formed from a plurality of the processing units.

5. The program product of claim 4, wherein the data processing system includes a memory storing a plurality of configuration data defining the input and/or output interfaces in the processing block, and
   the data flow designation instruction includes information for changing the input and/or output interfaces in the processing block by selecting one of the plurality of configuration data stored in the memory.

6. A recording medium storing thereon a program for controlling a data processing system including processing units, the program comprising a data flow designation instruction for designating input and/or output interfaces of at least one of the processing units independently of timing of execution of the processing unit for defining a data path configured by the processing unit.

7. A transmission medium having embedded therein a program product for controlling a data processing system including processing units, the program comprising a data flow designation instruction for designating input and/or output interfaces of at least one of the processing units independently of timing of execution of the processing unit for defining a data path configured by the processing unit.

8. A data processing system, comprising:
   a plurality of processing units including changeable input and/or output interfaces;
   a unit for fetching a data flow designation instruction for designating the input and/or output interfaces of at least one of the processing units independently of timing of execution of the processing unit; and
   a data flow designation unit for decoding the data flow designation instruction and setting the input and/or output interfaces of the processing unit for configuring a data path from a plurality of the processing units.

9. The data processing system of claim 8, wherein the data flow designation unit changes content of processing of the processing unit according to the data flow designation instruction.

10. The data processing system of claim 8, wherein the processing unit includes a specific internal data path.

11. The data processing system of claim 10, wherein the processing unit includes at least one logic gate, and an internal data path connecting the logic gate with the input/output interfaces.

12. The data processing system of claim 10, wherein the data flow designation unit selects a part of the internal data path of the processing unit according to the data flow designation instruction.

13. The data processing system of claim 8, wherein the data flow designation unit includes a function as a scheduler for managing the interfaces of the processing unit.

14. The data processing system of claim 8, wherein the data flow designation unit changes input and/or output interfaces in a processing block formed from a plurality of the processing units according to the data flow designation instruction.

15. The data processing system of claim 14, further comprising a memory storing a plurality of configuration data defining the input and/or output interfaces in the processing block, wherein the data flow designation unit changes the input and/or output interfaces in the processing block by selecting, according to the data flow designation instruction, one of the plurality of configuration data stored in the memory.

16. A method for controlling a data processing system including a plurality of processing units having changeable input and/or output interfaces, comprising:

a step of fetching a data flow designation instruction for designating the input and/or output interfaces of at least one of the processing units independently of timing of execution of the processing unit; and a data flow designation step of decoding the data flow designation instruction and setting the input and/or output interfaces of the processing unit for configuring a data path from a plurality of the processing units.

17. The method of claim 16, wherein in the data flow designation step, content of processing of the processing unit is changed according to the data flow designation instruction.

18. The method of claim 16, wherein the processing unit includes a specific internal data path, and in the data flow designation step, a part of the internal data path of the processing unit is selected according to the data flow designation instruction.

19. The method of claim 16, wherein in the data flow designation step, a schedule for retaining the interfaces of the processing unit is managed.

20. The method of claim 16, wherein in the data flow designation step, an input and/or output interfaces in a processing block formed from a plurality of the processing units is changed according to the data flow designation instruction.

21. The method of claim 20, wherein the data processing system includes a memory storing a plurality of configuration data defining the input and/or output interfaces in the processing block, wherein in the data flow designation step, the input and/or output interfaces in the processing block is changed by selecting one of the plurality of configuration data stored in the memory according to the data flow designation instruction.

* * * * *